(12) United States Patent
Ait Aoudia et al.

(10) Patent No.: US 12,556,437 B2
(45) Date of Patent: Feb. 17, 2026

(54) COMMUNICATION SYSTEM

(71) Applicant: NOKIA TECHNOLOGIES OY, Espoo (FI)

(72) Inventors: Faycal Ait Aoudia, Saint-Cloud (FR); Alvaro Valcarce Rial, Saint-Cloud (FR); Dalia-Georgiana Popescu, Paris (FR); Jakob Hoydis, Paris (FR)

(73) Assignee: Nokia Technologies Oy

( * ) Notice: Subject to any disclaimer, the term of this patent is extended or adjusted under 35 U.S.C. 154(b) by 0 days.

(21) Appl. No.: 17/926,043

(22) PCT Filed: May 19, 2021

(86) PCT No.: PCT/EP2021/063343
§ 371 (c)(1),
(2) Date: Nov. 17, 2022

(87) PCT Pub. No.: WO2021/234027
PCT Pub. Date: Nov. 25, 2021

(65) Prior Publication Data
US 2023/0188394 A1      Jun. 15, 2023

(30) Foreign Application Priority Data

May 22, 2020   (FI) ...................................... 20205518

(51) Int. Cl.
*H04L 27/26*      (2006.01)
*G06N 20/00*      (2019.01)

(52) U.S. Cl.
CPC ......... *H04L 27/2601* (2013.01); *G06N 20/00* (2019.01)

(58) Field of Classification Search
CPC .......... H04L 27/2601; H04L 25/03165; G06N 20/00; G06N 3/08; G06N 3/045; G06N 3/047
See application file for complete search history.

(56) References Cited

U.S. PATENT DOCUMENTS

2006/0104341 A1   5/2006  Magee et al.
2015/0193695 A1   7/2015  Cruz Mota et al.
(Continued)

FOREIGN PATENT DOCUMENTS

CN        1333959 A      1/2002
CN      108700652 A     10/2018
(Continued)

OTHER PUBLICATIONS

Seunghwan Lee, Hyungyu Ju and Byonghyo Shim, "Pilot Assignment and Channel Estimation via Deep Neural Network", 2018 24th Asia-Pacific Conference on Communications (APCC), Seoul National University, Seoul, Korea (Year: 2018).*
(Continued)

*Primary Examiner* — Aristocratis Fotakis
(74) *Attorney, Agent, or Firm* — Nokia Technologies Oy

(57) ABSTRACT

A communications system and method is described comprising: handshaking between a transmitter and a receiver of the communication system to initiate a training procedure, wherein said handshaking comprises a training setup request message comprising parameters for the training procedure, wherein the transmitter comprises trainable parameters and/or the receiver comprises trainable parameters; receiving identified training data from the transmitter at the receiver, wherein the training data comprises transmitter training data and/or receiver training data; sending training information from the receiver to the transmitter, wherein the training information comprises information for controlling training at the transmitter and/or the receiver; and terminating the training procedure.

15 Claims, 12 Drawing Sheets

(56) References Cited

U.S. PATENT DOCUMENTS

| | | | | |
|---|---|---|---|---|
| 2017/0257202 | A1* | 9/2017 | Zhang | H04L 27/2613 |
| 2018/0367192 | A1* | 12/2018 | O'Shea | H04B 7/0413 |
| 2019/0123885 | A1 | 4/2019 | Khandani | |
| 2021/0160149 | A1* | 5/2021 | Ma | H04W 76/10 |
| 2021/0194548 | A1* | 6/2021 | Pezeshki | G06N 3/045 |

FOREIGN PATENT DOCUMENTS

| | | | | |
|---|---|---|---|---|
| CN | 110753937 A | 2/2020 | | |
| EP | 3 418 948 A1 | 12/2018 | | |
| WO | WO-2018234084 A1 * | 12/2018 | | G05B 13/0265 |
| WO | 2019/192740 A1 | 10/2019 | | |
| WO | 2019/193377 A1 | 10/2019 | | |
| WO | 2019/193380 A1 | 10/2019 | | |
| WO | 2020/015840 A1 | 1/2020 | | |
| WO | 2020/064093 A1 | 4/2020 | | |
| WO | 2020/239232 A1 | 12/2020 | | |
| WO | 2020/259845 A1 | 12/2020 | | |
| WO | 2021/001015 A1 | 1/2021 | | |
| WO | 2021/043390 A1 | 3/2021 | | |
| WO | 2021/047776 A1 | 3/2021 | | |
| WO | WO-2021041862 A1 * | 3/2021 | | G06N 3/0454 |
| WO | 2021/083521 A1 | 5/2021 | | |

OTHER PUBLICATIONS

Mathieu Goutay, Fayçal Ait Aoudia, and Jakob Hoydis, Deep Reinforcement Learning Autoencoder with Noisy Feedback, Nokia Bell Labs, 2018 (Year: 2018).*

Junjie Ma, Chulong Liang, Chongbin Xu, and Li Ping "On Orthogonal and Superimposed Pilot Schemes in Massive MIMO NOMA Systems", IEEE Journal on Selected Areas in Communications, vol. 35, No. 12, Dec. 2017 (Year: 2017).*

International Search Report and Written Opinion dated Sep. 17, 2021 corresponding to International Patent Application No. PCT/EP2021/063343.

Fayçal Ait Aoudia et al., "End-to-End Learning of Communications Systems Without a Channel Model," arxiv.org, Apr. 6, 2018, XP080868283.

Fayçal Ait Aoudia et al., "Model-Free Training of End-to-End Communication Systems," IEEE Journal on Selected Areas in Communications, vol. 37, No. 11, Nov. 1, 2019, pp. 2503-2516, XP011750566.

Office Action dated Feb. 23, 2023, corresponding to Indian Patent Application No. 202217063592.

Communication pursuant to Article 94(3) EPC dated May 28, 2025 corresponding to European Patent Application No. 21727459.6.

Notification of First Office Action dated May 29, 2025 corresponding to Chinese Patent Application No. 2021800376200, with English translation thereof.

Asyhari et al., "Orthogonal or Superimposed Pilots? A Rate-Efficient Channel Estimation Strategy for Stationary MIMO Fading Channels", IEEE Transactions on Wireless Communications, vol. 16, No. 05, May 2017, pp. 2776-2789.

Verenzuela et al., "Spectral Efficiency of Superimposed Pilots in Uplink Massive MIMO Systems", IEEE Global Communications Conference, Dec. 4-8, 2017, 6 pages.

"SID Proposal: Study on AI/ML Model Transfer in 5GS", 3GPP TSG-SA WG1 Meeting #88, S1-193479, Agenda: 5, OPPO, Nov. 18-22, 2019, 3 pages.

"Key Drivers and Research Challenges for 6G Ubiquitous Wireless Intelligence", 6G Flagship, Sep. 2019, 36 pages.

"Architectural framework for machine learning in future networks including IMT-2020", Series Y: Global Information Infrastructure, Internet Protocol Aspects, Next-Generation Networks, Internet of Things and Smart Cities Future networks, ITU-T Recommendation Y.3172, Jun. 2019, 32 pages.

Office action received for corresponding Chinese Patent Application No. 202180037620.0, dated Dec. 22, 2025, 6 pages of office action and 2 pages of translation available.

* cited by examiner

COMMUNICATION SYSTEM

FIELD

The present specification relates to communication systems, for example to training communication systems (e.g. using machine learning techniques).

BACKGROUND

Many aspects of communication systems can be trained. Although some protocols exist, there remains a need for further developments in this field.

US 2015193695 A1 discloses a machine learning model trained collaboratively by a plurality of devices in a network. EP3418948 A1 discloses a method for training a machine learning model of a data transmission network, where the machine learning model comprises a transmitter model including a transmitter neural network, a channel model, and a receiver model including a receiver neural network. WO 2020064093 A1 discloses end-to-end learning in communication systems. WO 2020015840 A1 discloses learning in communication systems by updating of parameters in a receiving algorithm.

US 2006104341 A1 relates to systems and methods for providing training data in packets transmitted to one or more receivers.

SUMMARY

In a first aspect, this specification describes a receiver of a communication system, the receiver comprising means for performing: handshaking with a transmitter of the communication system to initiate a training procedure, wherein said handshaking comprises a training setup request message (e.g. sent by the transmitter to the receiver or vice-versa) comprising parameters for the training procedure, wherein the transmitter comprises trainable parameters and/or the receiver comprises trainable parameters (e.g. the transmitter and/or the receiver may comprise neural networks); receiving identified training data (which training data may be labelled to distinguish from user traffic) from the transmitter, wherein the training data comprises transmitter training data and/or receiver training data; sending training information from the receiver to the transmitter, wherein the training information comprises information for controlling training at the transmitter and/or the receiver; and terminating the training procedure. Termination could be by the transmitter or the receiver and could be by completion or by interruption. The receiver may be a symbol demapper (e.g. for QAM demodulation) having trainable parameters, however other receiver configurations (e.g. a MIMO receiver) are possible.

The receiver may further comprising means for performing: training the receiver, based on the labelled training data, by updating the trainable parameters of the receiver, wherein the training data received from the transmitter comprises said receiver training data. The receiver may be trained such that the receiver is adapted to a specific radio environment. The communication system may be an OFDM communication system having pilot signals allocated amongst resource element of an OFDM transmission, wherein training the receiver comprises learning a mapping between received signals and LLRs, given a pilot allocation used by the transmitter. The training may seek to increase the information rate of the transmission.

The receiver training data (e.g. an RX training burst, in response to which the receiver parameters are optimised) may comprise a sequence of known symbols (e.g. known QAM symbols) sent by the transmitter to the receiver. The symbols may include labels for the training data that may be provided in a training setup request.

The identified training data may be identified by being provided in a dedicated training data channel.

The training information may comprise: feedback data indicative of a readiness of the receiver to receive further receiver training data from the transmitter; and/or performance information that enables the trainable parameters of the transmitter to be trained.

The receiver may further comprises means for performing: sending a receiver initiated training setup request to the transmitter for initiating the handshaking; and/or the transmitter may further comprise means for performing: sending a transmitter initiated training setup request for initiating the handshaking. The receiver or the transmitter may send a training accept message to accept the transmitter-initiated or receiver-initiated training setup request respectively. Either the transmitter or the receiver may be able to reject the training setup request (regardless of whether the transmitter or the receiver issued the initial setup request).

The receiver may further comprise means for performing: sending a receiver training complete message to the transmitter for indicating that training of the receiver is complete; and/or the transmitter further comprises means for performing: sending a transmitter training complete message to the receiver for indicating that training of the transmitter is complete.

The receiver may further comprise means for performing: sending a training interrupt message to the transmitter for indicating that training of the receiver and/or the transmitter is to be terminated; and/or the transmitter further comprises means for performing: sending a training interrupt message to the receiver for indicating that training of the receiver and/or the transmitter is to be terminated.

In a second aspect, this specification describes a transmitter of a communication system, the transmitter comprising means for performing: handshaking with a receiver of the communication system to initiate a training procedure, wherein said handshaking comprises a training setup request message (e.g. sent by the transmitter to the receiver or vice-versa) comprises parameters for the training procedure, wherein the transmitter comprises trainable parameters and/or the receiver comprises trainable parameters (the transmitter and receiver may comprise neural networks); sending identified training data (which training data may be labelled to distinguish it from user traffic) to the receiver, wherein the training data comprises transmitter training data and/or receiver training data; receiving training information from the receiver at the transmitter, wherein the training information comprises information for controlling training at the transmitter and/or the receiver; and terminating the training procedure. Termination could be by the transmitter or the receiver and could be by completion or by interruption.

The transmitter may further comprise means for performing: training the transmitter, based on the training data and the training information, by updating the trainable parameters of the transmitter, wherein the training data sent to the receiver comprises said transmitter training data. The training information may be similar to feedback provided to help during training. The communication system may be an OFDM system, wherein the transmitter allocates pilot signals amongst resource elements of the OFDM system, wherein training the transmitter comprises training (e.g. to increase the information rate of the transmission) the allocation of said pilot signals amongst said resource elements.

The receiver training data (e.g. an RX training burst, in response to which the receiver parameters are optimised) may comprise a sequence of known symbols (e.g. known QAM symbols) sent by the transmitter to the receiver. The symbols may include labels for the training data that may be provided in a training setup request.

The identified training data may be identified by being provided in a dedicated training data channel.

The training information may comprise: feedback data indicative of a readiness of the receiver to receive further receiver training data from the transmitter; and/or performance information that enables the trainable parameters of the transmitter to be trained.

The receiver may further comprises means for performing: sending a receiver initiated training setup request to the transmitter for initiating the handshaking; and/or the transmitter may further comprise means for performing: sending a transmitter initiated training setup request for initiating the handshaking. The receiver or the transmitter may send a training accept message to accept the transmitter-initiated or receiver-initiated training setup request respectively. Either the transmitter or the receiver may be able to reject the training setup request (regardless of whether the transmitter or the receiver issued the initial setup request).

The receiver may further comprise means for performing: sending a receiver training complete message to the transmitter for indicating that training of the receiver is complete; and/or the transmitter further comprises means for performing: sending a transmitter training complete message to the receiver for indicating that training of the transmitter is complete.

The receiver may further comprise means for performing: sending a training interrupt message to the transmitter for indicating that training of the receiver and/or the transmitter is to be terminated; and/or the transmitter further comprises means for performing: sending a training interrupt message to the receiver for indicating that training of the receiver and/or the transmitter is to be terminated.

In the first and second aspects, the means may comprise: at least one processor; and at least one memory including computer program code, the at least one memory and the computer program configured, with the at least one processor, to cause the performance of the apparatus.

In a third aspect, this specification describes a method comprising: handshaking between a transmitter and a receiver of a communication system to initiate a training procedure, wherein said handshaking comprises a training setup request message comprising parameters for the training procedure, wherein the transmitter comprises trainable parameters and/or the receiver comprises trainable parameters; receiving identified training data from the transmitter at the receiver, wherein the training data comprises transmitter training data and/or receiver training data; sending training information from the receiver to the transmitter, wherein the training information comprises information for controlling training at the transmitter and/or the receiver; and terminating the training procedure. Termination could be by the transmitter or the receiver and could be by completion or by interruption. The receiver may be a symbol demapper (e.g. for QAM demodulation) having trainable parameters, however other receiver configurations (e.g. a MIMO receiver) are possible.

The method may comprise: training the receiver, based on the labelled training data, by updating the trainable parameters of the receiver, wherein the training data received from the transmitter comprises said receiver training data. The receiver may be trained such that the receiver is adapted to a specific radio environment. The communication system may be an OFDM communication system having pilot signals allocated amongst resource element of an OFDM transmission, wherein training the receiver comprises learning a mapping between received signals and LLRs, given a pilot allocation used by the transmitter. The training may seek to increase the information rate of the transmission.

The receiver training data (e.g. an RX training burst, in response to which the receiver parameters are optimised) may comprise a sequence of known symbols (e.g. known QAM symbols) sent by the transmitter to the receiver. The symbols may include labels for the training data that may be provided in a training setup request.

The identified training data may be identified by being provided in a dedicated training data channel.

The training information may comprise: feedback data indicative of a readiness of the receiver to receive further receiver training data from the transmitter; and/or performance information that enables the trainable parameters of the transmitter to be trained.

The method may comprise: sending a receiver initiated training setup request to the transmitter for initiating the handshaking; and/or the transmitter may further comprise means for performing: sending a transmitter initiated training setup request for initiating the handshaking. The receiver or the transmitter may send a training accept message to accept the transmitter-initiated or receiver-initiated training setup request respectively. Either the transmitter or the receiver may be able to reject the training setup request (regardless of whether the transmitter or the receiver issued the initial setup request).

The method may comprise: sending a receiver training complete message to the transmitter for indicating that training of the receiver is complete; and/or the transmitter further comprises means for performing: sending a transmitter training complete message to the receiver for indicating that training of the transmitter is complete.

The method may further comprise: sending a training interrupt message to the transmitter for indicating that training of the receiver and/or the transmitter is to be terminated; and/or the transmitter further comprises means for performing: sending a training interrupt message to the receiver for indicating that training of the receiver and/or the transmitter is to be terminated.

In a fourth aspect, this specification describes a method comprising: handshaking between a transmitter and a receiver of a communication system to initiate a training procedure, wherein said handshaking comprises a training setup request message comprising parameters for the training procedure, wherein the transmitter comprises trainable parameters and/or the receiver comprises trainable parameters; sending identified training data from the transmitter to the receiver, wherein the training data comprises transmitter training data and/or receiver training data; receiving training information from the receiver at the transmitter, wherein the training information comprises information for controlling training at the transmitter and/or the receiver; and terminating the training procedure. Termination could be by the transmitter or the receiver and could be by completion or by interruption.

The method may comprise: training the transmitter, based on the training data and the training information, by updating the trainable parameters of the transmitter, wherein the training data sent to the receiver comprises said transmitter training data. The training information may be similar to feedback provided to help during training. The communication system may be an OFDM system, wherein the transmitter allocates pilot signals amongst resource elements of the OFDM system, wherein training the transmitter comprises training (e.g. to increase the information rate of the transmission) the allocation of said pilot signals amongst said resource elements.

The receiver training data (e.g. an RX training burst, in response to which the receiver parameters are optimised) may comprise a sequence of known symbols (e.g. known QAM symbols) sent by the transmitter to the receiver. The symbols may include labels for the training data that may be provided in a training setup request.

The identified training data may be identified by being provided in a dedicated training data channel.

The training information may comprise: feedback data indicative of a readiness of the receiver to receive further receiver training data from the transmitter; and/or performance information that enables the trainable parameters of the transmitter to be trained.

The method may comprise: sending a receiver initiated training setup request to the transmitter for initiating the handshaking; and/or the transmitter may further comprise means for performing: sending a transmitter initiated training setup request for initiating the handshaking. The receiver or the transmitter may send a training accept message to accept the transmitter-initiated or receiver-initiated training setup request respectively. Either the transmitter or the receiver may be able to reject the training setup request (regardless of whether the transmitter or the receiver issued the initial setup request).

The method may comprise: sending a receiver training complete message to the transmitter for indicating that training of the receiver is complete; and/or the transmitter further comprises means for performing: sending a transmitter training complete message to the receiver for indicating that training of the transmitter is complete.

The method may comprise: sending a training interrupt message to the transmitter for indicating that training of the receiver and/or the transmitter is to be terminated; and/or the transmitter further comprises means for performing: sending a training interrupt message to the receiver for indicating that training of the receiver and/or the transmitter is to be terminated.

In a fifth aspect, this specification describes a method comprising: initialising (e.g. random initialisation) parameters of pilot allocation algorithm, wherein the pilot allocation algorithm allocates pilot symbols amongst a plurality of resource elements of an OFDM communication system, wherein the OFDM communication system comprises a transmitter, a channel and a receiver; generating training data for transmission in accordance with the pilot allocation algorithm; updating trainable parameters (e.g. trainable weights of a neural network) of the pilot allocation algorithm based on a loss function, wherein the loss function is based on an information rate metric of the communication system; and repeating the generating and updating until a first condition is reached.

The pilot allocation algorithm may set a number of pilot signals and/or a distribution of pilot signals amongst the resource elements. Thus, both the quantity and the distribution of pilot signals amongst resource elements are potentially trainable parameters.

The transmitter may: modulate data bits to generate data symbols (the modulation itself may be trained (e.g. geometric shaping)—this may be an additional variable within the loss function); and superimpose the data symbols with pilot symbols in accordance with the pilot allocation algorithm (e.g. based on a pilot matrix generated by the pilot allocation algorithm).

The pilot allocation may comprise superimposed pilot signals or orthogonal pilot signals.

The method may comprise: updating trainable parameters (e.g. trainable weights of a neural network) of a receiver algorithm based on said loss function. The loss function is related to one or more of block error rate, bit error rate and categorical cross-entropy.

At least some of the parameters of the pilot allocation algorithm (and, optionally, also the receiver algorithm) may be trained using stochastic gradient descent.

The first condition may comprise a defined number of iterations and/or a predefined performance criterion according to said information rate metric.

The method may comprise: handshaking between the transmitter and the receiver of the communication system to initiate a training procedure, wherein said handshaking comprises a training setup request message (e.g. sent by the transmitter to the receiver or vice-versa) comprises parameters for the training procedure, wherein the transmitter comprises trainable parameters and/or the receiver comprises trainable parameters (for example, the transmitter and the receiver may be neural networks); sending identified training data from the transmitter to the receiver, wherein the training data comprises transmitter training data and/or receiver training data; sending training information from the receiver to the transmitter, wherein the training information comprises information for controlling training at the transmitter and/or the receiver; and terminating the training procedure. Termination could be by the transmitter or receiver. Termination could be by completion of by interruption.

In a sixth aspect, this specification describes an apparatus configured to perform (at least) any method as described with reference to the third to fifth aspects.

In a seventh aspect, this specification describes computer-readable instructions which, when executed by computing apparatus, cause the computing apparatus to perform (at least) any method as described with reference to the third to fifth aspects.

In an eighth aspect, this specification describes a computer-readable medium (such as a non-transitory computer-readable medium) comprising program instructions stored thereon for performing (at least) any method as described above with reference to the third to fifth aspects.

In a ninth aspect, this specification describes an apparatus comprising: at least one processor; and at least one memory including computer program code which, when executed by the at least one processor, causes the apparatus to perform (at least) any method as described above with reference to the third to fifth aspects.

In a tenth aspect, this specification describes a computer program comprising instructions for causing an apparatus to perform at least the following: handshaking between a transmitter and a receiver of a communication system to initiate a training procedure, wherein said handshaking comprises a training setup request message comprising parameters for the training procedure, wherein the transmitter comprises trainable parameters and/or the receiver comprises trainable parameters; receiving identified training data from the transmitter at the receiver, wherein the training data comprises transmitter training data and/or receiver training data; sending training information from the receiver to the transmitter, wherein the training information comprises information for controlling training at the transmitter and/or the receiver; and terminating the training procedure.

In an eleventh aspect, this specification describes a computer program comprising instructions for causing an apparatus to perform at least the following: handshaking between a transmitter and a receiver of a communication system to initiate a training procedure, wherein said handshaking comprises a training setup request message comprising parameters for the training procedure, wherein the transmitter comprises trainable parameters and/or the receiver comprises trainable parameters; sending identified training data from the transmitter to the receiver, wherein the training data comprises transmitter training data and/or receiver training data; receiving training information from the receiver at the transmitter, wherein the training information comprises information for controlling training at the transmitter and/or the receiver; and terminating the training procedure.

In a twelfth aspect, this specification describes an apparatus comprising: means (such as an initiation module) for handshaking between a transmitter and a receiver of a communication system to initiate a training procedure, wherein said handshaking comprises a training setup request message comprising parameters for the training procedure, wherein the transmitter comprises trainable parameters and/or the receiver comprises trainable parameters; means (such as a first input) for receiving identified training data from the transmitter at the receiver, wherein the training data comprises transmitter training data and/or receiver training data; means (such as a first output) for sending training information from the receiver to the transmitter, wherein the training information comprises information for controlling training at the transmitter and/or the receiver; and means (such as a control module) for terminating the training procedure.

In a thirteenth aspect, this specification describes an apparatus comprising: means (such as an initiation module) for handshaking between a transmitter and a receiver of a communication system to initiate a training procedure, wherein said handshaking comprises a training setup request message comprising parameters for the training procedure, wherein the transmitter comprises trainable parameters and/or the receiver comprises trainable parameters; means (such as a first output) for sending identified training data from the transmitter to the receiver, wherein the training data comprises transmitter training data and/or receiver training data; means (such as a first input) for receiving training information from the receiver at the transmitter, wherein the training information comprises information for controlling training at the transmitter and/or the receiver; and means (such as a control module) for terminating the training procedure.

BRIEF DESCRIPTION OF THE DRAWINGS

Example embodiments will now be described, by way of example only, with reference to the following schematic drawings, in which.

DETAILED DESCRIPTION

Figure 1:
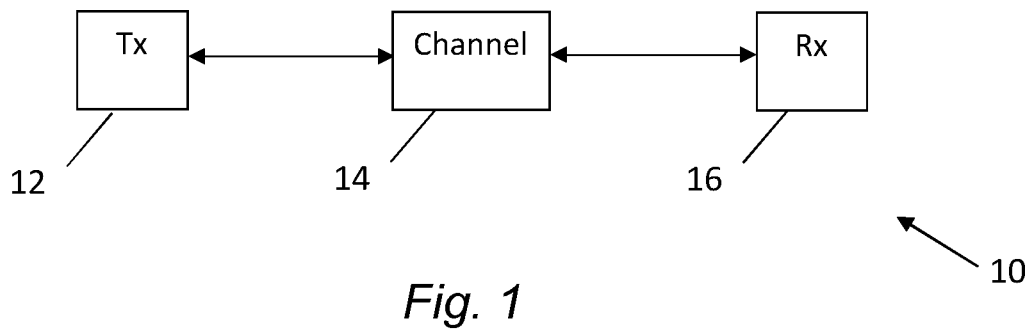
FIG. 1 is a block diagram of a system in accordance with an example embodiment.

The scope of protection sought for various embodiments of the invention is set out by the independent claims. The embodiments and features, if any, described in the specification that do not fall under the scope of the independent claims are to be interpreted as examples useful for understanding various embodiments of the invention.

In the description and drawings, like reference numerals refer to like elements throughout.

FIG. 1 is a block diagram of a system, indicated generally by the reference numeral 10, in accordance with an example embodiment. The system 10 comprises a transmitter 12 and a receiver 16 that can communicate using a channel 14. The transmitter 12 and the receiver 16 may be in two-way communication with the channel 14. It should be noted that in many example embodiments, the transmitter 12 may be able to operate as a receiver and the receiver 16 may be able to operate as a transmitter. As described in detail below, training procedures may be provided for training the transmitter 12 and/or the receiver 16.

The principles described herein are applicable to training in many communication technologies, such as Bluetooth transmitters, 802.11 receivers, optical transceivers, point-to-multipoint cellular systems, etc. By way of example, the communication system 10 may be an OFDM communication system in which pilot signals are allocated amongst resource elements of an OFDM transmission. An example of training in such a system is training the receiver 16 to learn a mapping between received signals log likelihood ratios (LLRs), given a pilot allocation used by the transmitter 12 (as discussed in detail below). The skilled person will be aware of many other example systems in which the principles described herein may be used.

Figure 2:
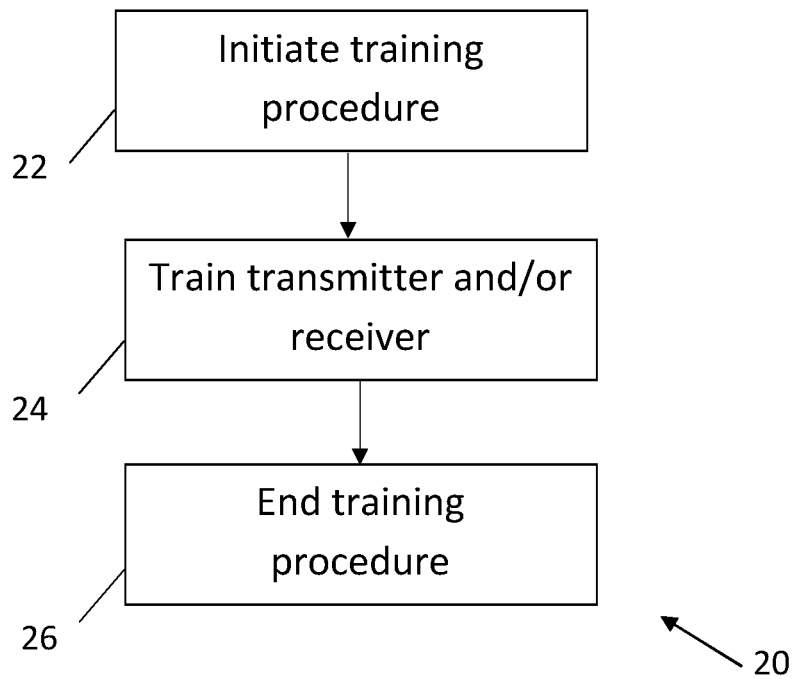
FIG. 2 is a flow chart showing an algorithm in accordance with an example embodiment.

FIG. 2 is a flow chart showing an algorithm, indicated generally by the reference numeral 20, in accordance with an example embodiment.

The algorithm 20 starts at operation 22, where a training procedure is initiated. For example, the training procedure may be initiated using a handshaking procedure between the transmitter 12 and the receiver 16. Many example handshaking procedures are described further below.

With the training procedure initiated, the algorithm 20 moves to operation 24 where the transmitter 12 and/or the receiver 16 is/are trained. The operation 24 may take many forms, for example:

Training of the receiver 16 (without training the transmitter 12). An example of how this procedure could be used is the L1 training of a neural network-based demapper for a typical QAM modulation. Such training may allow the demapper to be adapted to a specific radio environment.

Training of the transmitter 12 (without training the receiver 16). This procedure could be used, for example, to optimize a neural network-based modulator in a transmitter for a specific receiver.

Joint training of both the transmitter 12 and the receiver 16. For example, this procedure may be used to training of geometric or probabilistic shaping as these affect both the transmitter and the receiver.

At operation 26, the algorithm 20 is ended. A number of arrangements for terminating example training procedures are described further below.

Many transmitters and receivers in communication systems make use of machine learning applications for signal processing on the physical layer and above. Many of these applications require some form of training. A number of procedures and message exchanges are described below that enable data-driven optimization of such transceiver components.

Although machine learning holds great promise to improve algorithms found at the various layers of a communications system, there is a need for protocols that supports the exchange of data suitable for online training.

For example, at the physical layer, a symbol demapper within the receiver 16 may be implemented as a neural network rather than a hard-coded algorithm. For optimal functioning of the demapper, training of the neural network may be required. For example, the transmitter 12 may send a sequence of known symbols to the receiver that can then use the received sequence as a labelled data set for training. In another L1 example, the transmitter 12 may optimize the constellation used for modulation of coded bits (i.e., geometric shaping). In order to do this, the transmitter 12 may send a training sequence of symbols to the receiver 16 for which the receiver will compute a feedback signal that the transmitter can use to improve an existing constellation geometry. In both these examples, various control messages and meta-data may be exchanged between the transmitter and the receiver.

At higher layers, the principles described herein can also be used to negotiate, start, manage and terminate training sessions for various algorithms. For example, a training session could be established between an uplink transmitter and a receiver to optimise Open Loop Power Control (OLPC) decisions at the receiver.

Figure 3:
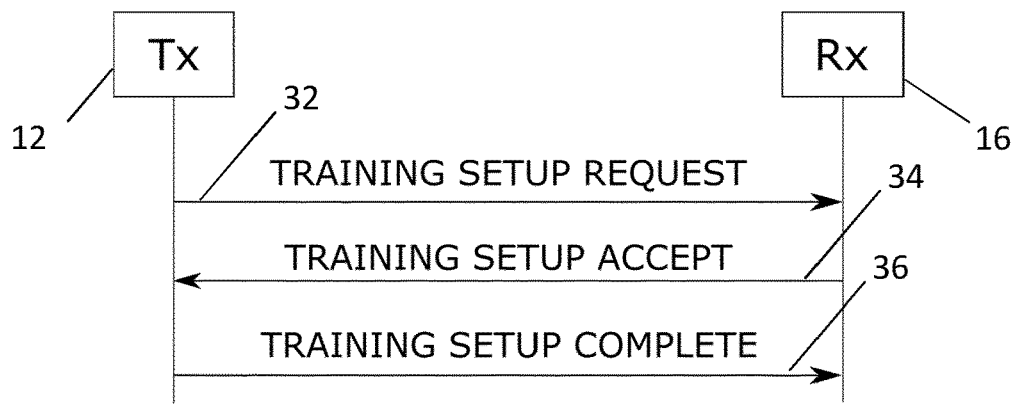
FIGS. 3 to 8 shows message sequences in accordance with example embodiments.

FIG. 3 shows a message sequence, indicated generally by the reference numeral 30 in accordance with an example embodiment. The message sequence 30 takes place between the transmitter 12 and the receiver 16.

The message sequence 30 is a three-way training setup handshake that is an example implementation of the operation 22 described above. The message sequence 30 includes a training setup request 32, sent from the transmitter 12 to the receiver 16. On receipt of the request 32, the receiver sends a training setup accept message 34 to the transmitter. On receipt of the accept message, the transmitter sends a training setup complete message 36 to the receiver.

Figure 4:
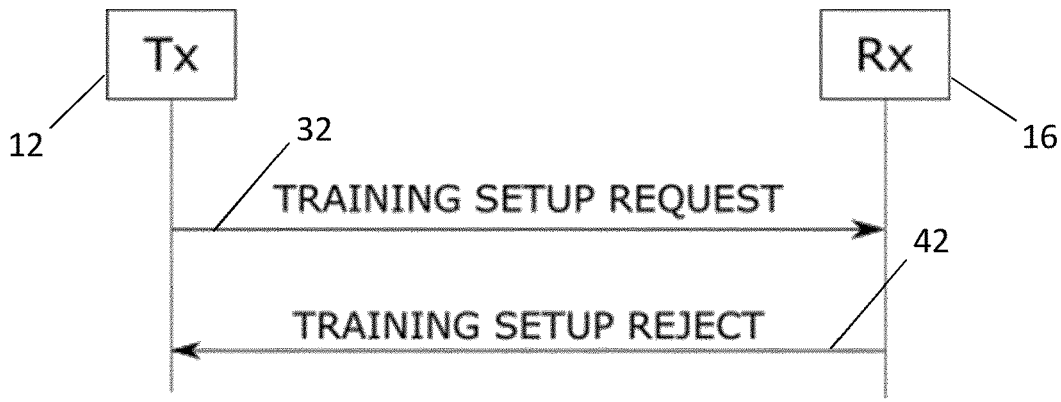

FIG. 4 shows a message sequence, indicated generally by the reference numeral 40, in accordance with an example embodiment. The message sequence 40 includes the training setup request message 32 described above sent from the transmitter 12 to the receiver 16. However, in the message sequence 40, instead of accepting the training setup request, the receiver 16 responds with a training setup reject message 42. This terminates the handshaking procedure.

Figure 5:
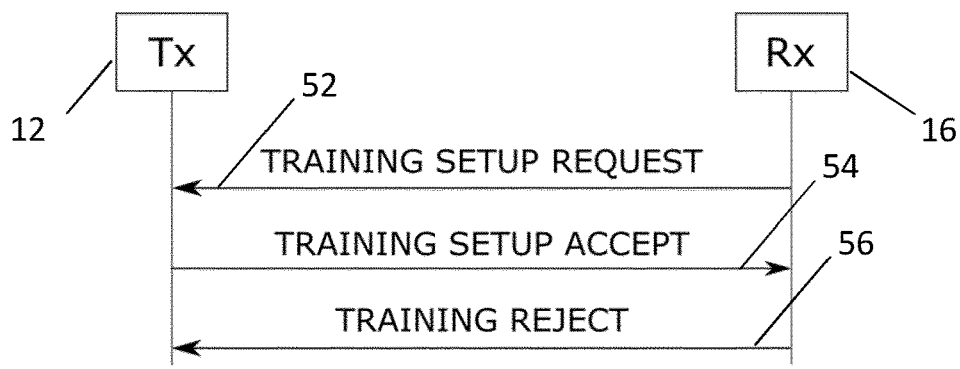

Although the message sequences 30 and 40 are initiated by the transmitter 12, this is not essential. By way of example, FIG. 5 shows a message sequence, indicated by the reference numeral 50, in accordance with an example embodiment, in which the training procedure is initiated by the receiver 16.

The message sequence 50 includes a training setup request 52, sent from the receiver 16 to the transmitter 12. On receipt of the request 52, the transmitter sends a training setup accept message 54 to the receiver. On receipt of the accept message, the receiver could send a training setup complete message (similar to the message 36) to the receiver, but in the particular message sequence 50, the receiver sends a training reject message 56 to the transmitter 12. The training reject message 56 terminates the handshaking procedure.

Thus, the receiver 16 may comprise means for sending a receiver-initiated training setup request to the transmitter 12 for initiating the handshaking. In response, the transmitter can accept or reject the receiver initiated training setup request. Similarly, the transmitter 12 may comprise means for sending a transmitter-initiated training setup request for initiating the handshaking, in response to which the receiver can accept or reject the training setup request.

Figure 6:
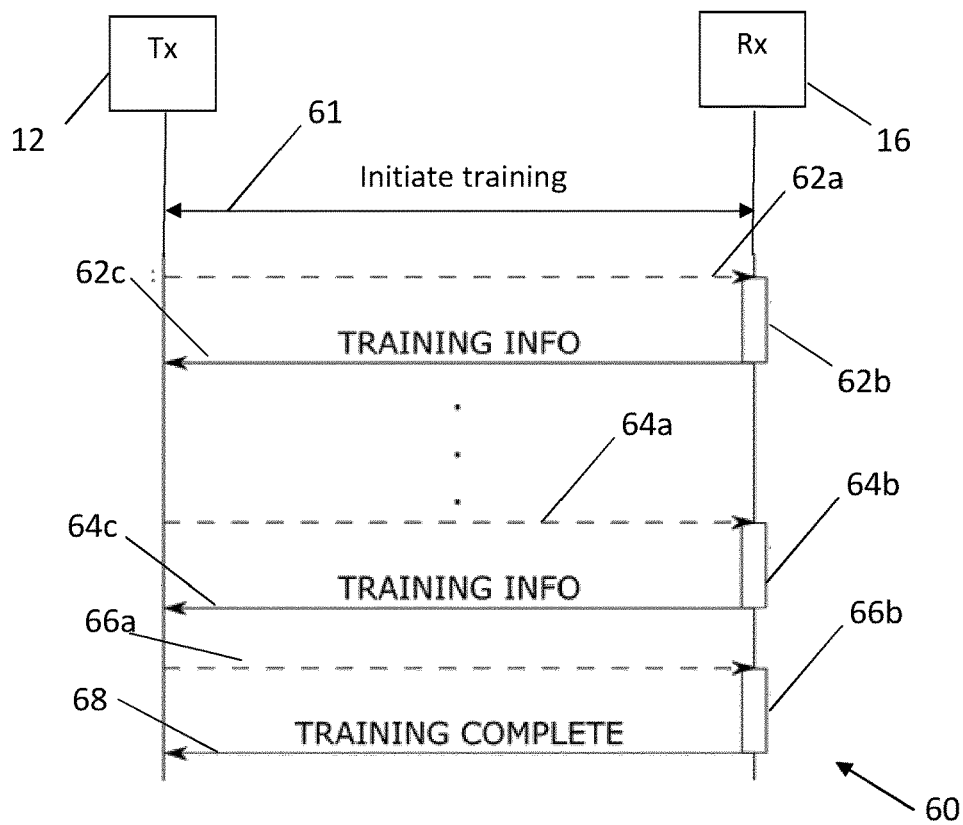

FIG. 6 shows a message sequence, indicated generally by the reference numeral 60, in accordance with an example embodiment. The message sequence 60 is an example implementation of the algorithm 20 described above.

The message sequence 60 starts with an exchange of messages 61 initiated a training process. The messages 61 implement the operation 22 and may take many forms (such as the message sequence 30 described above).

After the successful completion of the handshaking of the initialising procedure, the transmitter 12 may send an RX training burst 62a. The RX training burst 62a may comprise a sequence of known symbols (e.g. known QAM symbols) sent by the transmitter 12 to the receiver 16.

Upon reception of the RX training burst 62a, the receiver 16 optimizes its parameters during a training epoch 62b and returns a TRAINING INFO message 62c to the transmitter 12. The TRAINING INFO message 62c signals that the receiver 16 is ready to receive a further training burst. The specific algorithms and methods used for this optimization are implementation-specific are not discussed in detail here.

In response to the TRAINING INFO message 62c, the transmitter 12 sends a further RX training burst 64a, the receiver carriers out another training epoch 64b and the receiver return a TRAINING INFO message 64c, and so on.

The message sequence 60 procedure continues until either the receiver 16 sends a TRAINING COMPLETE message to the transmitter (indicating that the training of the receiver is deemed to be complete) or some other message is sent that terminates the training procedure (e.g. a TRAINING INTERRUPT message sent from the transmitter to the receiver). In the example message sequence 60, the transmitter sends an RX training burst 66a, in response to which the receiver 16 carriers out a training epoch 66b and returns a TRAINING COMPLETE message 68, thereby terminating the message sequence 60.

Example formats of the TRAINING INFO, TRAINING INTERRUPT, and TRAINING COMPLETE messages are provided below.

Each of the RX training bursts 62a, 64a and 66a is a data sequence that enables the performance of the receiver 16 to be evaluated (by the receiver) and for the receiver parameters to be updated accordingly. In order to support simultaneous transmission of user-plane and training data, the RX training bursts may be labelled accordingly. The time duration of the RX training burst may be arbitrarily large.

In the embodiment of L1 receiver training, the training bursts may take the form of QAM symbols, transmitted on a user-plane L1 channel. The labels for a training burst consisting of modulated symbols could be the associated modulated bits or symbol indices. The labels could be provided explicitly or implicitly, for example by pointing towards a predefined list or through the seed of a random number generator. This procedure could allow, e.g., for the optimization of a neural network-based demapper. The training data for this may be received modulated symbols on some resource blocks together with the corresponding bit labels. The symbols received during a training burst could be split into multiple mini-batches for stochastic gradient descent (SGD) based training of the neural network. Once the training has converged or a fixed number of iterations has been reached, the receiver terminates the training procedure.

An L2 embodiment of the RX training bursts for the purpose of OLPC optimisation at the receiver may be pseudo-randomly generated dummy data. This data could be encapsulated in transport blocks and then sent to the receiver 16. Note that the procedure described herein allows the training session to be initiated from either the transmitter or the receiver endpoint, as discussed further below.

Figure 7:
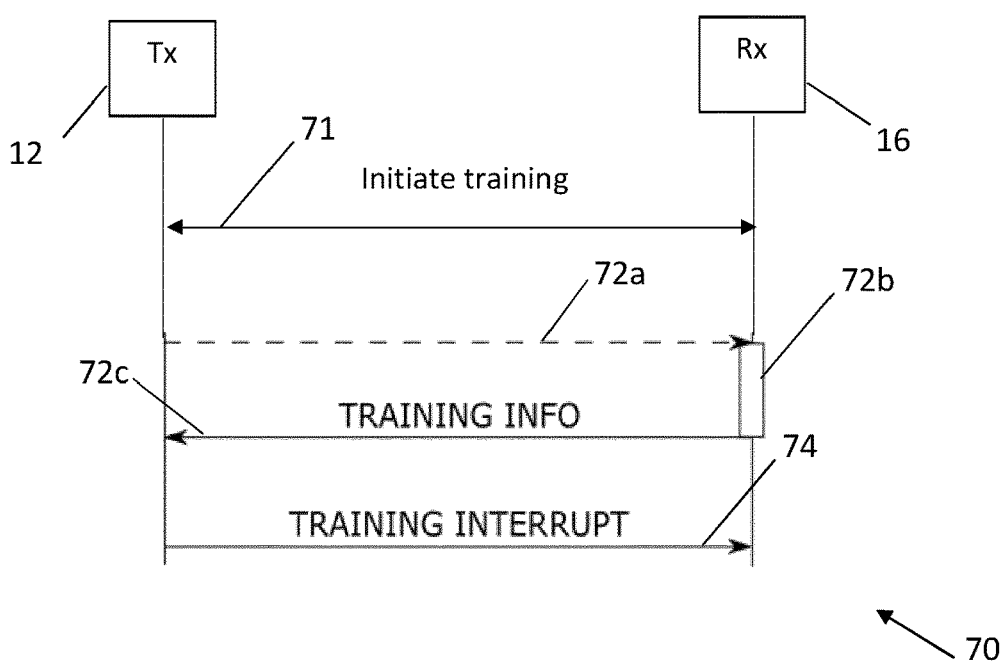

FIG. 7 shows a message sequence, indicated generally by the reference numeral 70, in accordance with an example embodiment. The message sequence 70 is an example implementation of the algorithm 20 described above.

The message sequence 70 starts with an exchange of messages 71 initiating a training process. The messages 71 implement the operation 22 and may take many forms (such as the message sequence 30 described above).

After the successful completion of the handshaking of the initialising procedure, the transmitter 12 sending an RX training burst 72a. Upon reception of this burst, the receiver 16 optimizes its parameters during a training epoch 72b and returns a TRAINING INFO message 72c to the transmitter. The messages 71, 72a, 72b and 72c may be identical to the messages 61, 61a, 62b and 62c described above.

In response to the TRAINING INFO message 72c, the transmitter 12 sends a TRAINING INTERRUPT message 74 to the receiver 16. The message 74 indicates that the training of the receiver is to be terminated (thereby implementing the operation 26 of the algorithm 20).

Figure 8:
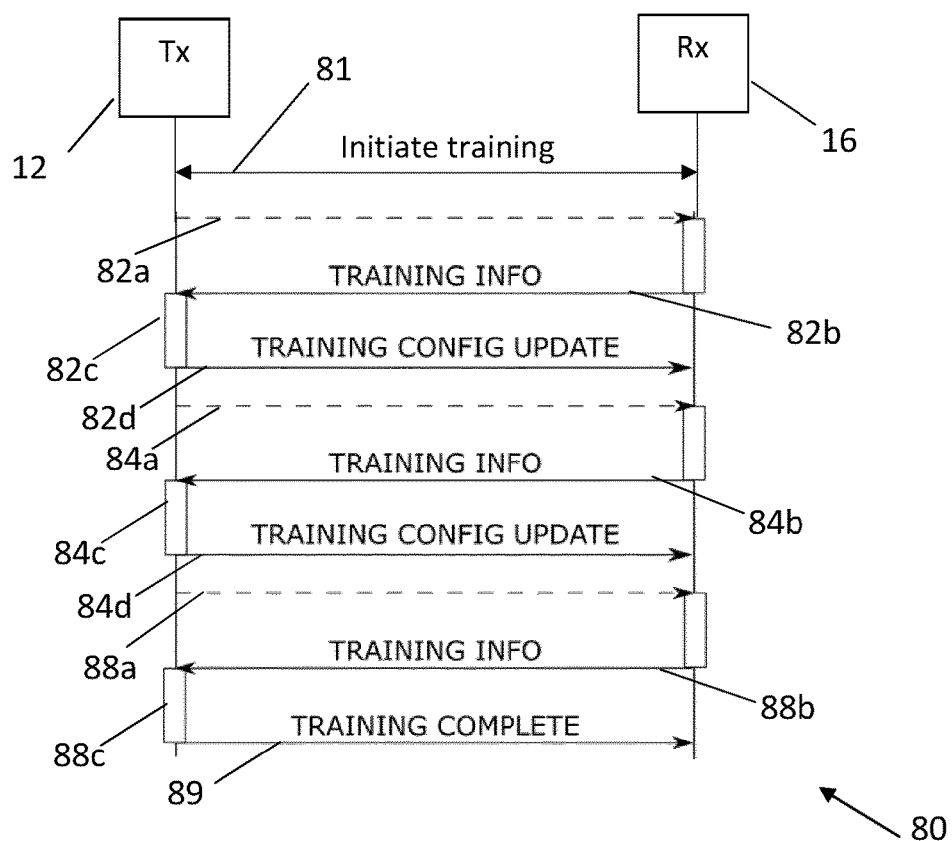

FIG. 8 shows a message sequence, indicated generally by the reference numeral 80, in accordance with an example embodiment. The message sequence 80 is an example implementation of the algorithm 20 described above.

The message sequence 80 starts with an exchange of messages 81 initiated a training process. The messages 81 implement the operation 22 and may take many forms (such as the message sequence 30 described above).

After the successful completion of the handshaking of the initialising procedure, the transmitter 12 sends a TX training burst 82a. The TX training burst 82a can be arbitrarily large and may be chosen such that the feedback computation is of sufficient statistical significance.

Upon reception of the TX training burst 82a, the receiver 16 computes a feedback signal, which feedback signal is sent back to the transmitter within a TRAINING INFO message 82b. The transmitter 12 uses the feedback signal and the knowledge of the TX training burst 82a to optimize its parameters during a training epoch 82c. In some cases, the configuration of the transmitter after the training epoch 82c, e.g., the constellation geometry may be changed. Therefore, the transmitter sends an optional TRAINING CONFIG UPDATE message 82d to the receiver to inform it about changes which are required to compute the feedback signal for the next TX training burst.

The exchange of TX training burst 82a, TRAINING INFO 82b and TRAINING CONFIG UPDATE 82d after a training epoch 82c can continue multiple times until it is terminated by the TRAINING COMPLETE message sent by the transmitter (or until the training is terminated in some other way, such as by a TRAINING INTERRUPT message).

By way of example, the message sequence 80 comprises a second TX training burst 84a, second TRAINING INFO message 84b, second training epoch 84c, second TRAINING CONFIG UPDATE message 84d, third TX training burst 88a, third TRAINING INFO message 88b, third training epoch 88c and a TRAINING COMPLETE message 89.

As with the message sequence 60 and 70 describe above, the TX training procedure in the message sequence 80 could be interrupted at any time by one of the devices sending a TRAINING INTERRUPT message.

An example L1 TX training procedure could be, when a transmitter would like to learn the optimal modulation constellation to be used for a low-cost receiver. Here, the training burst may consist of modulated symbols based on whose reception the receiver computes a loss metric, e.g., binary cross entropy, bit error rate. The loss is then fed back to the receiver in the L1 Training Info message which may be used by the transmitter to optimize the way it modulates symbols.

An example of an L3 TX training procedure could be the training of a ML-based Mobility Robustness Optimization (MRO) algorithm for transmitter-controlled receiver-mobility. MRO decisions would take place on the transmitter and their purpose may be to have the transmitter select an optimal combination of mobility parameters for the receiver. This procedure allows the transmitter to negotiate a training session for this purpose with the receiver and then explore multiple such parameter combinations. The feedback provided by the receiver can then be exploited by the transmitter to evaluate the tested parameters and converge on an optimal solution.

Figure 9:
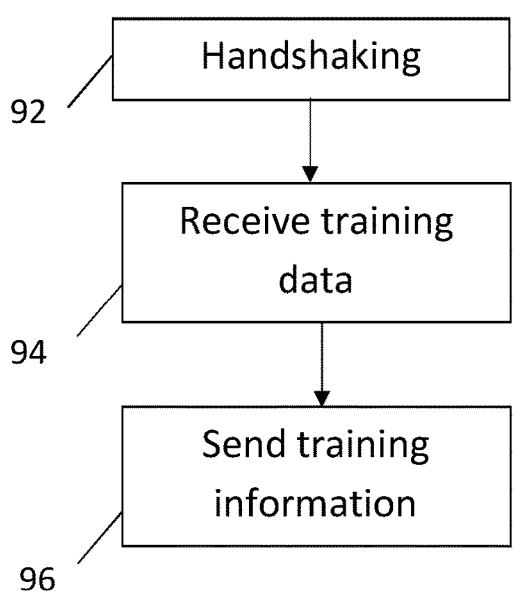
FIGS. 9 and 10 are flow charts showing algorithms in accordance with example embodiments.

FIG. 9 is a flow chart showing an algorithm, indicated generally by the reference numeral 90, in accordance with an example embodiment. The algorithm 90 may be implemented at the receiver 16 of the communication system 10, wherein the transmitter 12 and/or the receiver 16 comprises trainable parameters. For example, one or both of the transmitter and the receiver may be implemented as neural networks.

At operation 92 of the algorithm 90, the receiver conducts handshaking with the transmitter of the communication system to initiate a training procedure (thereby implementing the operation 22 of the algorithm 20 described above). The handshaking may comprise a training setup request message (sent by the transmitter to the receiver or vice-versa) comprising parameters for the training procedure.

At operation 94, the receiver receives identified training data from the transmitter. The training data (which may be labelled so that it is distinguished from user traffic) may comprise transmitter training data and/or receiver training data.

At operation 96, the receiver sends training information to the transmitter. The training information may comprise information for controlling training at the transmitter and/or the receiver.

Thus, the operation 24 of the algorithm 20 may be implemented by one or both of the operations 94 and 96 (depending on whether transmitter training or receiver training is being implemented).

On completion of the operation 96, the training procedure may be terminated (e.g. implementing the operation 26). For example, the termination may be initiated by the transmitter or the receiver and may take the form of algorithm completion or interruption.

Figure 10:
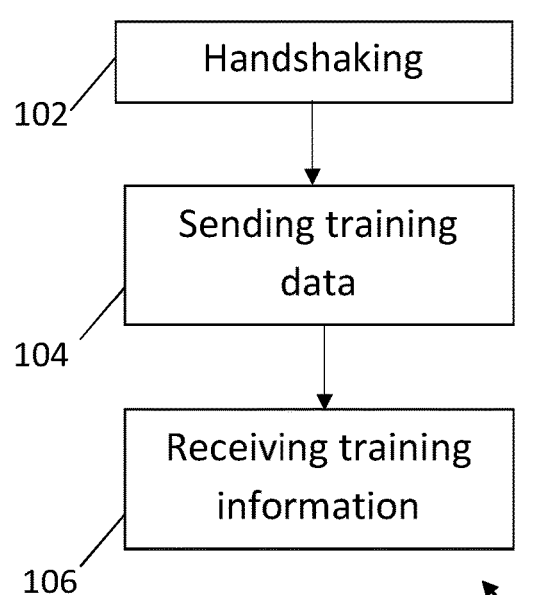

FIG. 10 is a flow chart showing an algorithm, indicated generally by the reference numeral 100, in accordance with an example embodiment. The algorithm wo may be implemented at the receiver 12 of the communication system 10, wherein the transmitter 12 and/or the receiver 16 comprises trainable parameters. For example, one or both of the transmitter and the receiver may be implemented as neural networks.

At operation 102 of the algorithm wo, the transmitter conducts handshaking with the transmitter 12 of the communication system to initiate a training procedure (thereby implementing the operation 22 of the algorithm 20 described above). The handshaking may comprise a training setup request message (sent by the transmitter to the receiver or vice-versa) comprising parameters for the training procedure.

At operation 104, the transmitter sends training data to the receiver. The training data (which may be labelled so that it is distinguished from user traffic) may comprise transmitter training data and/or receiver training data. (The training data sent in the operation 104 may be received at the receiver in the operation 94 described above.)

At operation 106, the transmitter receives training information from the receiver 16. The training information may comprise information for controlling training at the transmitter and/or the receiver.

Thus, the operation 24 of the algorithm 20 is implemented by one or both of the operations 104 and 106 (depending on whether transmitter training or receiver training is being implemented).

On completion of the operation 106, the training procedure may be terminated (e.g. implementing the operation 26). For example, the termination may be initiated by the transmitter or the receiver and may take the form of algorithm completion or interruption.

Although the previously described procedures for transmitter and receiver training already enable joint training of both (by alternating between transmitter and receiver training during multiple iterations), there is an interest in having a dedicated procedure for the optimization of both. This procedure may be useful, for example, for the optimization of geometric and probabilistic shaping.

Figure 11:
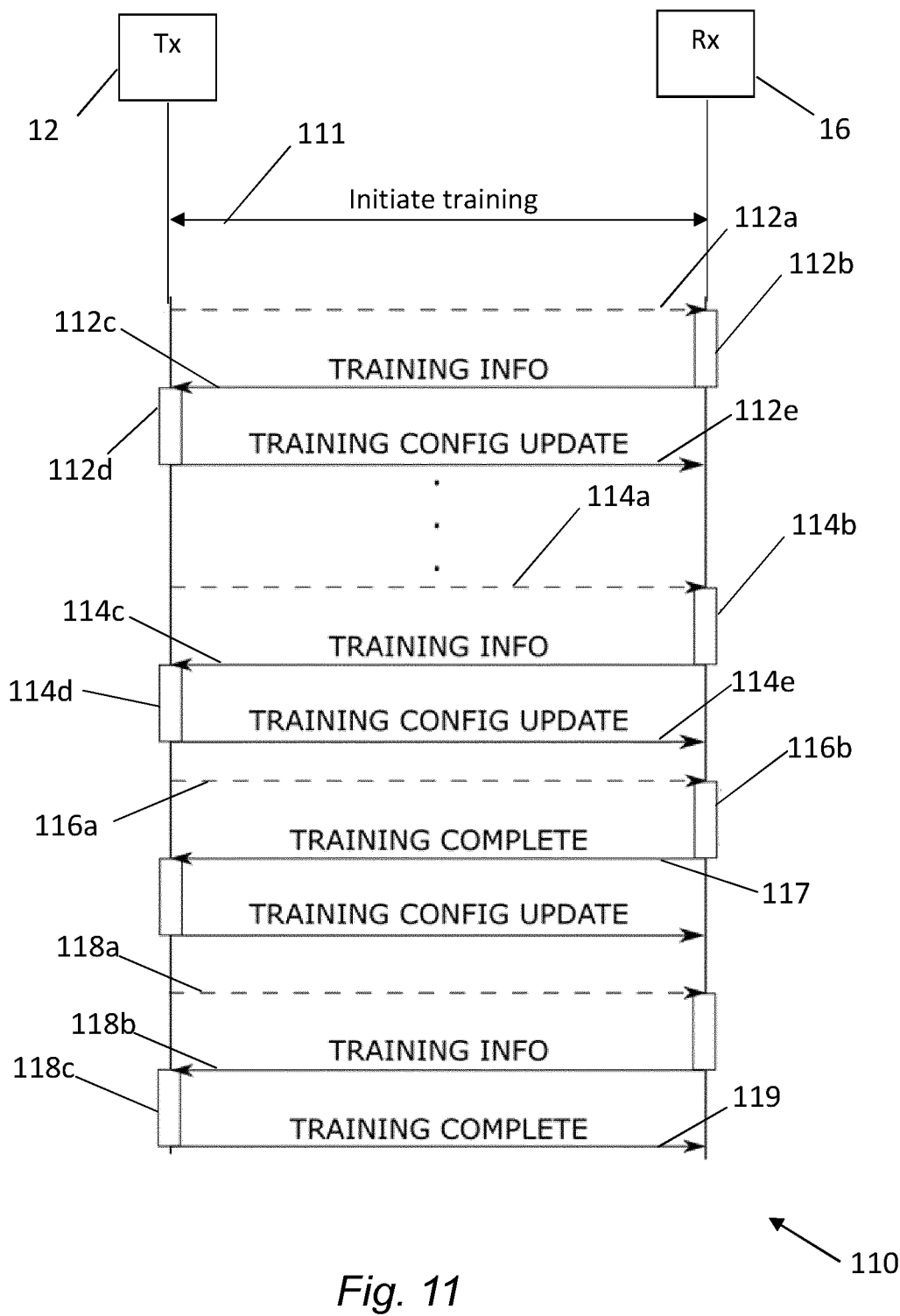
FIG. 11 is a message sequence in accordance with an example embodiment.

FIG. 11 is a message sequence, indicated generally by the reference numeral 110, in accordance with an example embodiment. The message sequence 110 enables joint transmitter and receiver training, as described further below. The message sequence 110 is an example implementation of the algorithm 20 described above.

The message sequence 110 starts with an exchange of messages 111 initiating a training process. The messages 111 implement the operation 22 and may take many forms (such as the message sequence 30 described above).

After the successful completion of the handshaking of the initialising procedure in, the transmitter 12 sends a combined TX training burst and RX training burst 112a. Upon reception of the TX training burst, the receiver 16 computes a feedback signal and upon reception of the RX training burst, the receiver 16 starts its own optimization during a first training epoch 112b.

After the first training epoch 112b, the receiver responds with a TRAINING INFO message 112c which carriers a feedback signal as well as other information related to its own training process. The transmitter 12 uses the feedback signal included within the message 112c and the knowledge of the TX training burst to optimize its parameters during a second training epoch 112d. In some cases, the configuration of the transmitter has changed after the second training epoch 112d, e.g., the constellation geometry may have changed. Therefore, the transmitter may send an optional TRAINING CONFIG UPDATE message 112e to the receiver with the changes required to compute the feedback signal for the next TX training burst.

The exchange of RX and TX training bursts, TRAINING INFO, and TRAINING CONFIG UPDATE messages can continue multiple times. Both transmitter and receiver can signal that their individual training is complete by sending the TRAINING COMPLETE message.

In the message sequence 110, the transmitter 12 sends a second combined TX training burst and RX training burst 114a. Upon reception of the second TX training burst, the receiver 16 computes a feedback signal and upon reception of the second RX training burst, the receiver 16 starts its own optimization during a second training epoch 114b. After the second training epoch 114b, the receiver sends a second TRAINING INFO message 114c, the transmitter implements a second training epoch 114d and optionally sends a second TRAINING CONFIG UPDATE message 114e to the receiver with the changes required to compute the feedback signal for the next TX training burst.

In the message sequence 110, the transmitter 12 sends a third combined TX training burst and RX training burst 116a. Upon reception of the third TX training burst, the receiver implements a training epoch 116b and then determines that it has finished training. A TRAINING COMPLETE message 117 is send from the receiver to the transmitter. From this moment on, the transmitter only sends a TX training burst and the rest of the procedure resembles the transmitter training already described above. It is also possible that the transmitter may finish training first. In this case, the procedure continues like the receiver training procedure described earlier. The procedure can be interrupted at any time by any of the devices by sending an TRAINING INTERRUPT message.

The message sequence 110 therefore includes a TX training burst 118a sent from the transmitter 12 to the receiver 16, TRAINING INFO message 118b and transmitter training epoch 118c, at which point the transmitter determines that it is fully trained. In response, the transmitter sends a TRAINING COMPLETE message 119, thereby terminating the message sequence 110.

As with the message sequences 60, 70 and 80 described above, the training procedure in the message sequence 110 could be interrupted at any time by one of the devices sending a TRAINING INTERRUPT message.

Figure 12:
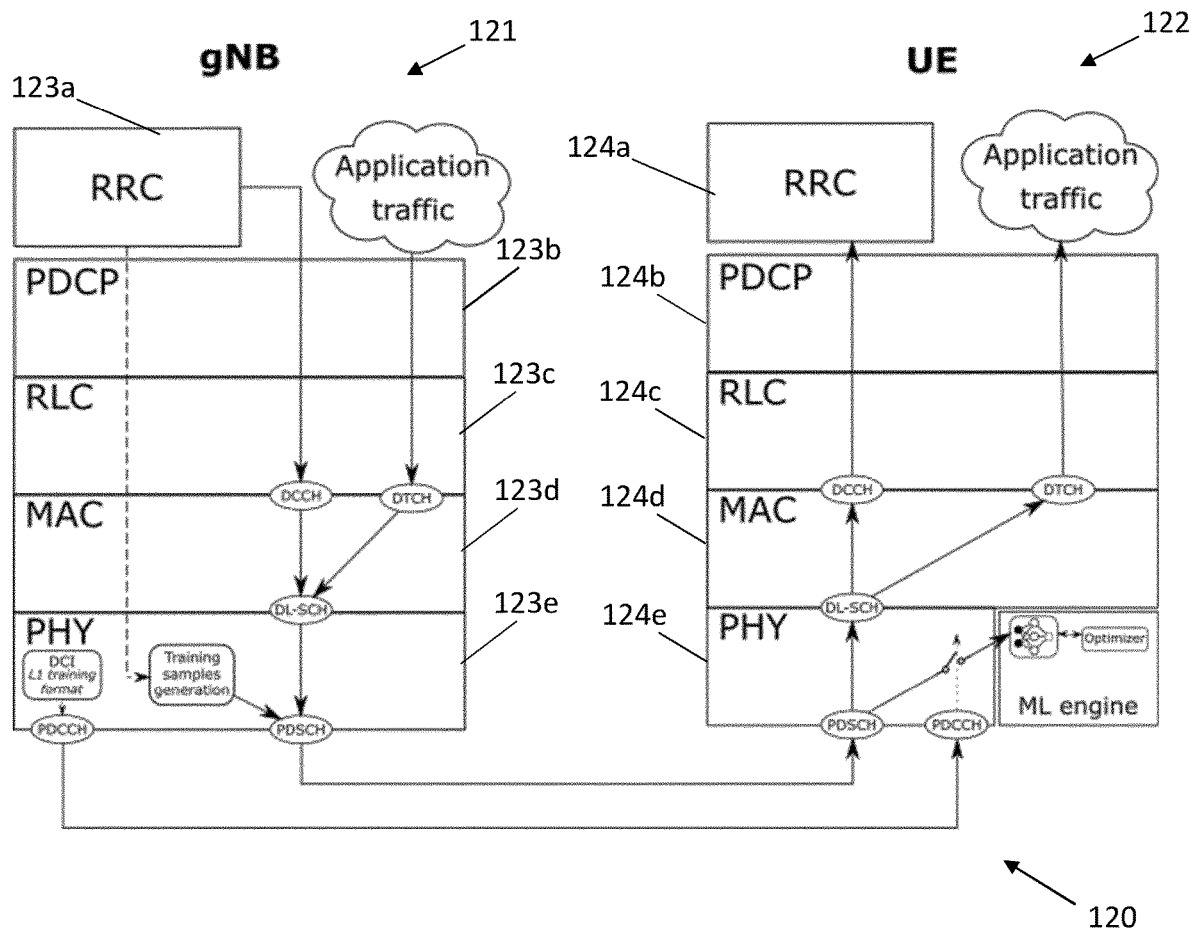
FIGS. 12 and 13 are block diagrams of systems in accordance with example embodiments.

FIG. 12 is a block diagram of a system, indicated generally by the reference numeral 120, in accordance with an example embodiment. The system 120 may be used to implement any of the algorithms 20, 90 or wo described above, or any of the message sequence 30, 40, 50, 60, 70, 80 or no described above.

The system 120 shows part of a communication system, such as a 3GPP system comprising a communication node (gNB) 121 and a user device (UE) 122.

The communication node 121 comprises radio resource control (RRC) module 123a, packet data convergence protocol (PDCP) module 123b, radio link control (RLC) module 123c, medium access control (MAC) module 123d and physical layer (PHY) 123e. Similarly, the user device 122 comprises radio resource control (RRC) module 124a, packet data convergence protocol (PDCP) module 124b, radio link control (RLC) module 124c, medium access control (MAC) module 124d and physical layer (PHY) 124e.

Control plane messages described herein are generally exchanged between the RRC module 123a of the communication node 121 and the RRC 124a of the user device 122. On the other hand, training data is generally produced and consumed at the applicable layer and is not conveyed to upper layers during reception.

As shown in FIG. 12, application traffic generated at the communication node 121 is provided to a dedicated traffic channel (DTCH) and control information generated at the RRC 123a is provided to a dedicated control channel (DCCH). The control and traffic information are combined into a downlink shared channel (DL-SCH) and provided to the user device 122 over the physical layers.

Training samples are generated at the physical layer and transmitted from the communication node 121 to the user device 122 over the physical layers.

The control information, traffic information and training samples are provided to a physical downlink shared channel (PDSCH) of the user device and are separated at the user device such that the training samples are provided to a machine learning engine, the control information is provided to RRC 124a and the application traffic is routed to the application layer.

Of course, the system 120 is provided by way of example only. The skilled person will be aware of many variants that could be used in example embodiments.

A number of messages have been described above. Example message formats that may be used in example embodiments are described in detail below. As will be apparent to the skilled person, the message formats described below are provided by way of example only—alternatives are possible.

Training Setup Request

The training setup request message may be sent by a transceiver to a peer transceiver (e.g. from the transmitter 12 to the receiver 16 described above, or vice-versa). The training setup request is a petition to initiate a training session of a radio link and may have the following format set out below. (Note that the presence is either mandatory (M) or optional (O).

| IE/Group Name | Presence | IE type and range | Semantics description |
| --- | --- | --- | --- |
| TrainingTarget | M | ENUMERATED(modulation, code, resourceallocation, olpc) | The protocol property/function to be trained. |
| TrainingAgent | M | ENUMERATED(source, target, both) | Node that will execute the optimisation algorithm. Source: The node that first sent the Training Request message Target: The node that first received the Training Request message Both: All 2 nodes that exchanged the Training Request message. |
| TrainingLink | M | ENUMERATED(SourceToTarget, TargetToSource, both) | The concrete radio path, whose protocol will be optimised. |
| Trainingclasses | O | OCTET STRING | The vocabulary of possible transmitted/received sample categories (e.g. modulation symbols when trainingTarget = modulation) |
| GroundTruth | O | OCTET STRING | If trainingTarget = modulation, this IE includes some specification of the L1 modulation symbols to be transmitted. If trainingTarget = code, this IE includes some specification of the L1 codewords to be transmitted (e.g. modulation symbols and symbol labels). |

-continued

| IE/Group Name | Presence | IE type and range | Semantics description |
|---|---|---|---|
| | | | This IE can contain implicit (e.g. the training samples themselves) or explicit (an index to a table, a pseudorandom seed, etc) data. |
| NumberOfRxTrainingSamples | O | INTEGER(0 . . . 4294967295) | If trainingTarget = modulation, this is the number of L1 training modulation symbols the transmitter must send to the receiver in the next training burst.<br>If trainingTarget = code, this is the number of L1 training codewords the transmitter must send to the receiver in the next training burst. |
| NumberOfTxTrainingSamples | O | INTEGER(0 . . . 4294967295) | If trainingTarget = modulation, this is the number of L1 training modulation symbols the transmitter must send to the receiver in the next training burst. The receiver will then only compute and send feedback to the transmitter for this number of symbols.<br>If trainingTarget = code, this is the number of L1 training codewords the transmitter must send to the receiver in the next training burst. |

Training Setup Reject

The training setup reject message may be sent by a transceiver to a peer transceiver. The message indicates that the request to initiate a training session for a radio link has failed.

| IE/Group Name | Presence | IE type and range | Semantics description |
|---|---|---|---|
| Cause | M | ENUMERATED (notallowed, notsupported, unsupportedparametervalues, unspecified) | |

Training Interrupt

The training interrupt message may be sent by a transceiver to a peer transceiver. The message indicates that the sending node is not able to support the receiving node any longer for training purposes.

| IE/Group Name | Presence | IE type and range | Semantics description |
|---|---|---|---|
| Cause | M | ENUMERATED(resourcesneeded, unspecified) | |

Training Setup Accept

The training setup accept message may be sent by a transceiver to a peer transceiver. If sent with the same parameters that were included in the received TRAINING SETUP REQUEST message, it indicates that the request to initiate a training session for a radio link has been approved. On the other hand, if sent with different parameters, the peer transceiver must confirm whether these are accepted by sending a subsequent TRAINING COMPLETE message. The peer transceiver may also reply with a subsequent TRAINING REJECT message if the newly proposed training parameters are not accepted.

| IE/Group Name | Presence | IE type and range | Semantics description |
|---|---|---|---|
| Trainingclasses | O | OCTET STRING | The vocabulary of possible transmitted/received sample categories (e.g. modulation symbols when trainingtarget = modulation) |
| GroundTruth | O | OCTET STRING | If trainingTarget = modulation, this IE includes some specification of the modulation symbols to be transmitted.<br>If trainingTarget = code, this IE includes some specification of the codewords to be transmitted (e.g. modulation symbols and symbol labels).<br>This IE can contain implicit (e.g. the training samples themselves) or explicit (an index to a table, a pseudorandom seed, etc) data. |
| NumberOfRxTrainingSamples | O | INTEGER(0 . . . 4294967295) | If trainingTarget = modulation, this is the number of L1 training modulation symbols the transmitter must send to the receiver in the next training burst.<br>If trainingTarget = code, this is the number of L1 training bit words the transmitter must send to the receiver in the next training burst. |

Training Setup Complete

The training setup complete message may be sent by a transceiver to a peer transceiver. The message indicates that the training parameters proposed by the peer transceiver have been accepted.

Training Config Update

The training config update message is sent by a transmitter to a peer receiver. The message may indicate that the sample categories that the receiver must use for training have changed, and it provides the new ones.

| IE/Group Name | Presence | IE type and range | Semantics description |
|---|---|---|---|
| TrainingClasses | O | OCTET STRING | The vocabulary of transmitted/received sample categories (e.g. modulation symbols when trainingtarget = modulation) |

Training Info

The training info message is sent by a receiver to a transmitter at some stack layer. The message indicates to the transmitter that the receiver is ready to receive another burst of training samples. In case of transmitter training, this message can also carry the predicted labels.

| IE/Group Name | Presence | IE type and range | Semantics description |
|---|---|---|---|
| NumberOfTrainingSamples | O | INTEGER(0 . . . 4294967295) | If trainingTarget = modulation, this is the number of L1 training modulation symbols the transmitter must send to the receiver in the next training burst. |

-continued

| IE/Group Name | Presence | IE type and range | Semantics description |
|---|---|---|---|
| | | | If trainingTarget = code, this is the number of L1 training bit words the transmitter must send to the receiver in the next training burst. |
| LastTrainingLoss | O | FLOAT(1.175494351E−38, 3.402823466E+38) | An indicator to the transmitter of the training progress. |
| PredictedLabels | O | OCTET STRING | If trainingTarget = modulation, this IE contains the symbols decoded by the receiver. If trainingTarget = code, this IE contains the codewords decoded by the receiver. These labels can be used by the transmitter to compute the loss and gradients. |

Training Complete

The training complete message is sent by a receiver to a transmitter. The message indicates to the transmitter that the receiver will not train any more on future received samples associated to this training session. The transmitter may therefore free up the resources it had allocated for this training session.

| IE/Group Name | Presence | IE type and range | Semantics description |
|---|---|---|---|
| NumberOfTrainingSamples | O | INTEGER(0 . . . 4294967295) | If trainingTarget = modulation, this is the number of L1 training modulation symbols the transmitter must send to the receiver in the next training burst. If trainingTarget = code, this is the number of L1 training bit words the transmitter must send to the receiver in the next training burst. |
| LastTrainingLoss | O | FLOAT(1.175494351E−38, 3.402823466E+38) | An indicator to the transmitter of the training progress. |
| PredictedLabels | O | OCTET STRING | If trainingTarget = modulation, this IE contains the symbols decoded by the receiver. If trainingTarget = code, this IE contains the codewords decoded by the receiver. These labels can be used by the transmitter to compute the loss and gradients. |

The message formats described above are provided by way of example only. Additional message formats are possible. Moreover, many variants to the message formats set out above will be apparent to the skilled person.

Figure 13:
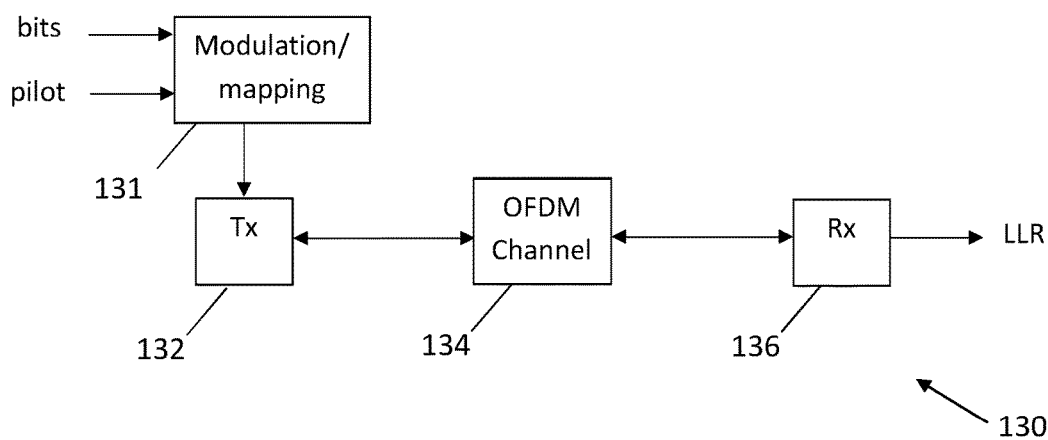

FIG. 13 is a block diagram of a system, indicated generally by the reference numeral 130, in accordance with an example embodiment.

The system 130 comprises a modulation or mapping module 131, a transmitter 132, a channel (e.g. an OFDM channel) 134 and a receiver 136. The system 130 may be used to implement at least some of the embodiments described above, such that the transmitter 132, the channel 134 and receiver 136 and may implement the transmitter 12, channel 14 and receiver 16 described above. However, this is not essential. At least some of the example embodiments described in detail below may be implemented either in combination with the embodiments described above, or separately from the embodiments described above.

The system 130 may be an OFDM communication system having pilot signals allocated amongst resource elements of an OFDM transmission (as discussed further below). The receiver 136 may be trained to learn a mapping between received signals and LLRs, given a pilot allocation used by the transmitter. The training may seek to increase an information rate of the transmission. The training is not essential to all embodiments (e.g. a non-trainable receiver may be used).

Figure 14:
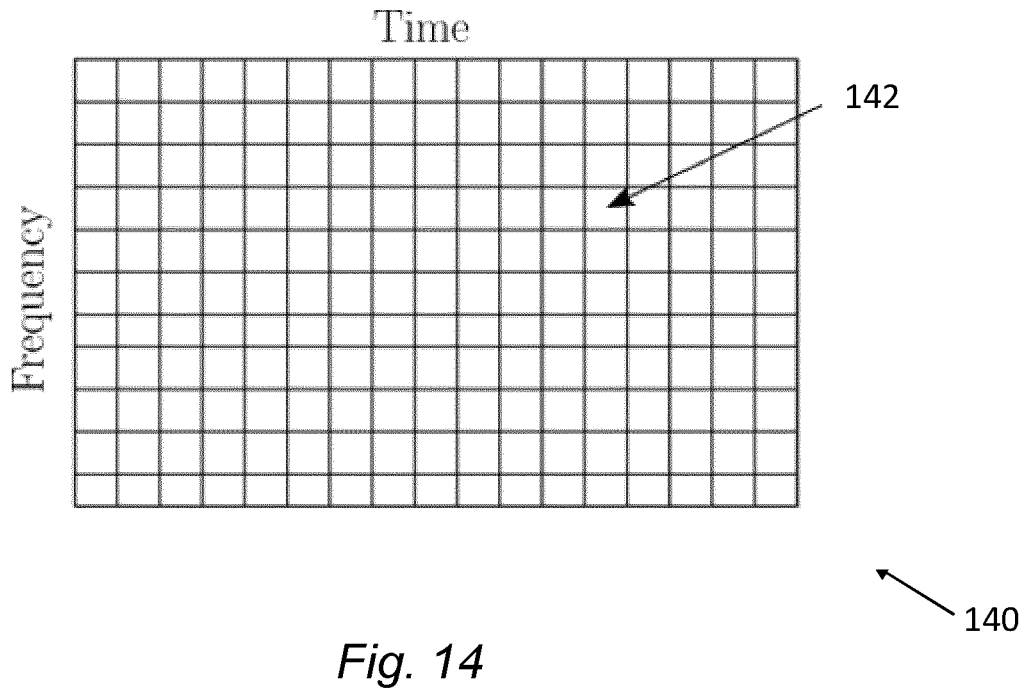
FIG. 14 shows a time-frequency grid of resource elements in accordance with an example embodiment.

FIG. 14 shows a time-frequency grid of resource elements, indicated generally by the reference numeral 140, in accordance with an example embodiment. An OFDM channel (such as the channel 134) may be represented by the time frequency grid 140.

Each cell of the grid 140, referred to as a resource element, can be used to transmit a complex channel symbol. (One such resource element is indicated by the reference numeral 142.) Such symbols can be either data-bearing modulated symbols, e.g., from a quadrature amplitude modulation (QAM) constellation, or pilot symbols which are deterministic. In some cases, modulated symbols and pilots are superimposed. Let's denote by $N_F$ the number of sub-carriers (rows in the grid 140) and by $N_T$ the number of time slots (columns in the grid 140) within a transmission time interval (TTI). In an OFDM communication system, a transmitter that aims to transmit a set of $N_B$ bit vectors $b_1, \ldots, b_{N_B}$ maps each bit vector $b_i$ to a complex channel symbol $x_i \in \mathbb{C}$ according to a constellation (e.g., QAM), and labelling scheme (e.g., Gray labeling). It is assumed that $N_B \leq N_T N_F$. The modulated symbols $x_i$ together with the pilot symbols $p_i$ are distributed over the time-frequency grid to form the matrix X of size $N_T \times N_F$ that is transmitted over the OFDM channel. The pilot symbols are typically allocated to specific resource elements according to pilot patterns defined by communication standards. The OFDM channel transfer function is given by:

$$Y = H \odot X + N$$

where H is the channel matrix of same size as X, N is a matrix of Gaussian independent and identically distributed noise of same size as X and H, and $\odot$ denotes the element-wise product.

In some communication systems, reconstructing the transmitted signal X from the received signal Y at the receiver requires estimating the channel matrix H. Channel estimation may be implemented by leveraging the transmitted pilot symbols.

It should be noted that since H is a complex matrix, the amplitude response (which is the squared norm of the elements of the channel matrix) is only one of the two components that may need to be estimated for each entry of H, the other component being the phase response.

Pilot allocation in OFDM systems (i.e., finding which amount of the available resources should be allocated to pilots, and where in the time-frequency grid the pilots should be put) is a difficult problem. Allocating too few resources to pilots tends to lead to poor performance as the receiver would be unable to correctly estimate the channel. On the other hand, allocating too much resource to pilots would lead to a waste of resources. Moreover, the placement of pilots within the time-frequency grid may be relevant to performance, since best performing receivers exploit the time and frequency correlations when estimating the channel matrix.

Figure 15:
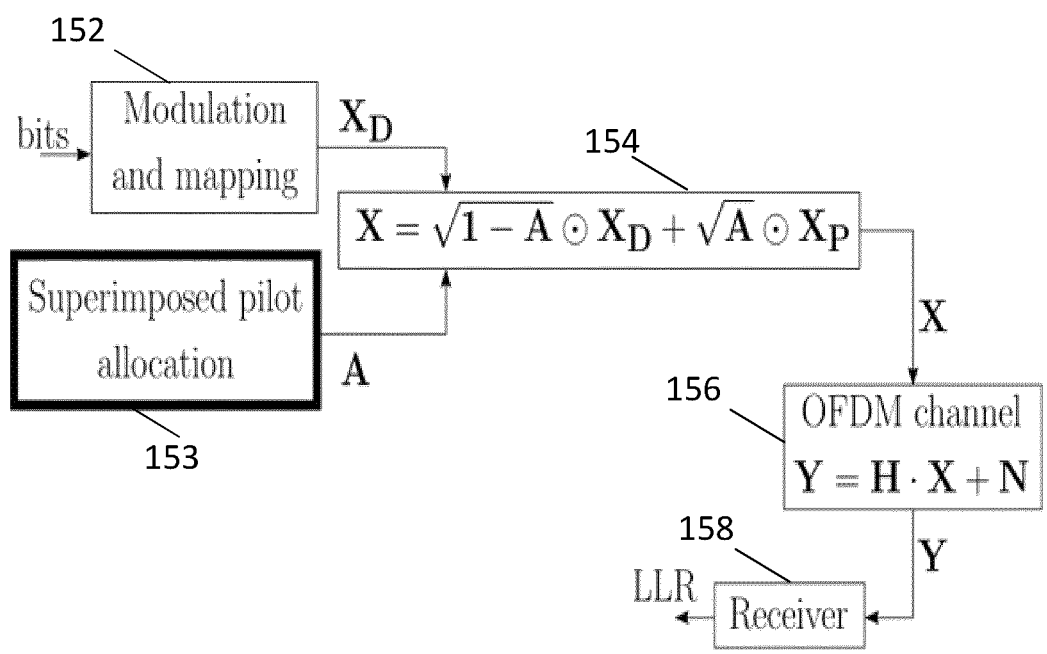
FIG. 15 is a block diagram of a system in accordance with an example embodiment.

FIG. 15 is a block diagram of a system, indicated generally by the reference numeral 150, in accordance with an example embodiment.

The system 150 comprises a modulation and mapping module 152, a pilot allocation module 153, a matrix generation module 154, a channel 156 and a receiver 158. The pilot allocation module 153 (shown with a thicker outline) is a trainable component.

Data bits are provided (from a data source) to the modulation and mapping module 152. The modulation and mapping module 152 modulates the data bits to generate data symbols, e.g. in the form of matrices of modulated data symbols of size $N_F \times N_T$ (denoted in FIG. 15 by $x_D$).

A pilot allocation matrix A is generated by the pilot allocation module 153 and provided to the matrix generation module 154 together with the matrix $X_D$ output by the modulation and mapping module 152. Thus, the pilot allocation matrix A may be computed by an algorithm with trainable parameters.

In the system 150, the pilot signals are superimposed to the data (in accordance with a pilot allocation algorithm) by the matrix generation module 154, such that each resource element carries a data symbol linearly combined with a pilot symbol (rather than each resource element being either fully dedicated to a pilot or to a data symbol). In the example system 150, pilot allocation consists of determining which ratio of power to allocate to pilot for each resource element. This allocation is given by the matrix A of size $N_F \times N_T$, which elements takes values in the range (0,1) and represent the ratio of energy allocated to pilot for each resource element. The transmitted element is the superimposition of the data symbols $X_D$ and predefined pilot symbols $x_P$. Scaling may be provided to ensure that the average power $E(\|X\|^2)$ is smaller than some predefined maximum power. The matrix of pilot symbols $X_P$ is, for example, the matrix for which all elements take a same value, such as $1/\sqrt{2}(1+j)$. Other options are possible to ensure that x has zero mean.

The channel symbol matrix X (i.e. the output of the matrix generation module 154) is transmitted over the OFDM channel 156, and the receiver 158 computes log-likelihood ratios (LLRs) for the transmitted bits from the received signal Y.

Figure 16:
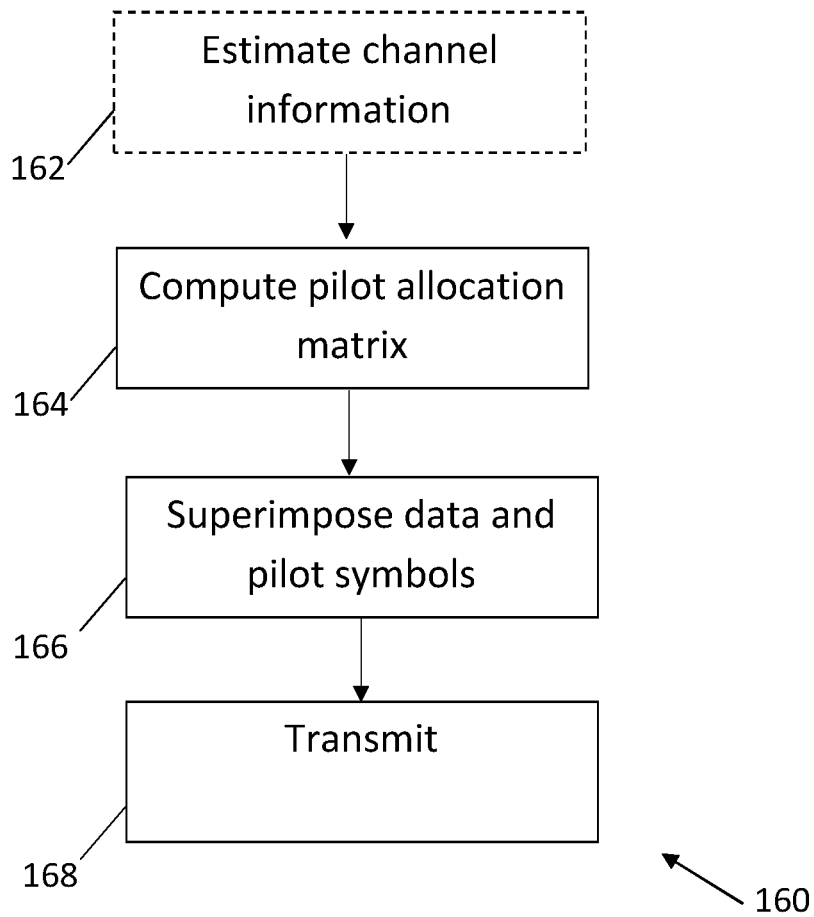
FIG. 16 is a flow chart showing an algorithm in accordance with an example embodiment.

FIG. 16 is a flow chart, indicated generally by the reference numeral 160, showing an algorithm in accordance with an example embodiment. The algorithm 160 may be implemented at the transmitter 132 and/or using elements of the system 150.

At optional operation 162, the transmitter estimates some information regarding the channel or obtains such information from the receiver. Possible information on the channel include the signal to noise ratio (SNR), coherence bandwidth, angular spread, etc.

At operation 164, the pilot allocation matrix A is computed, for example based on the channel information obtained in the operation 162. The pilot allocation matrix may be computed using the matrix generation module 154 described above. The pilot allocation matrix may be determined using a neural network, as discussed further below. Note that the algorithm with trainable parameters does not need to be a neural network. In some example embodiments, it is possible to directly optimize the matrix A, in which case no channel information would be required.

At operation 166, the allocation matrix A is used (for example by the matrix generation module 154) to superimpose pilots with the data symbols, by scaling pilots and data symbols according to the allocation matrix, as discussed above.

Finally, at operation 168, the so-obtained symbols are transmitted on the channel 134 or 156.

Assuming a differential receiver, the end-to-end systems 130 or 150 may be trained to maximize the information rate. Thus, the ratio of power allocated to pilot and its distribution on the time-frequency grid may be jointly optimized to maximize the information rate. Higher rates may be achieved by adapting the pilot allocation according to some channel quality indicator, such as the SNR, compared to a "one size fits all" approach.

Figure 17:
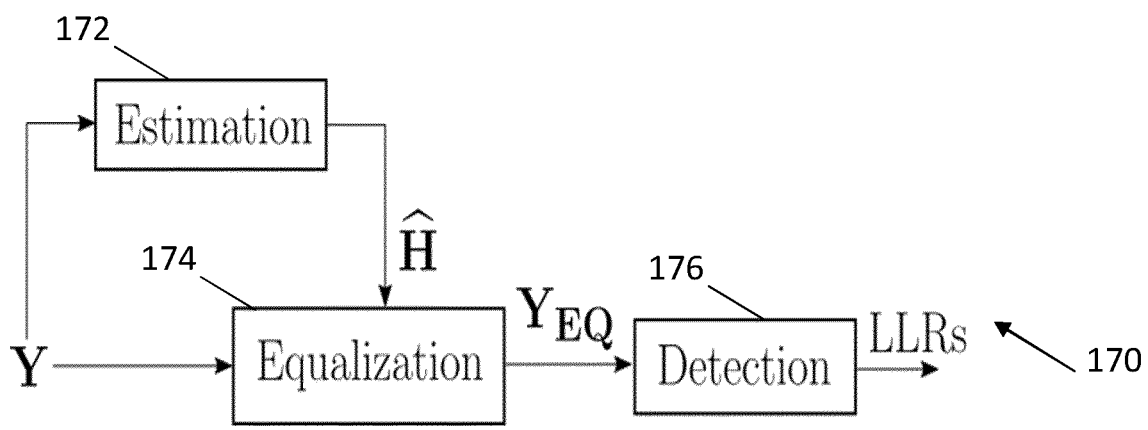
FIG. 17 is a block diagram of a receiver in accordance with an example embodiment.

FIG. 17 is a block diagram of a received, indicated generally by the reference numeral 170, in accordance with an example embodiment. The receiver 170 comprises an estimation module 172, an equalisation module 174 and a detection module 176.

The estimation module 172 computes an estimate $\hat{H}$ of the channel matrix H. This can be done using, for example, using a classical linear minimum mean square error (LMMSE) estimator. The equalisation module 174 equalises the received signal Y, i.e., the effect of the channel is reversed. This can be done using, for example, zero forcing (ZF) equalization. Finally, the equalized signal $Y_{EQ}$ is fed to the detection module 176 which computes LLRs. This may be implemented assuming perfect equalization and using the optimal AWGN channel demapper. Note that this receiver is differentiable, and therefore could be used with the training procedure described below.

The trainable pilot allocation scheme can be implemented (for example using the pilot allocation module 153) in multiple ways. A simple approach is to have a trainable matrix $\tilde{A}$ of size $N_F \times N_T$ (by trainable matrix, we mean that all elements of A are trainable). The allocation matrix is then given by A=σ(Ã) where σ(·) is the sigmoid function, which takes value in the range (0, 1).

Figure 18:
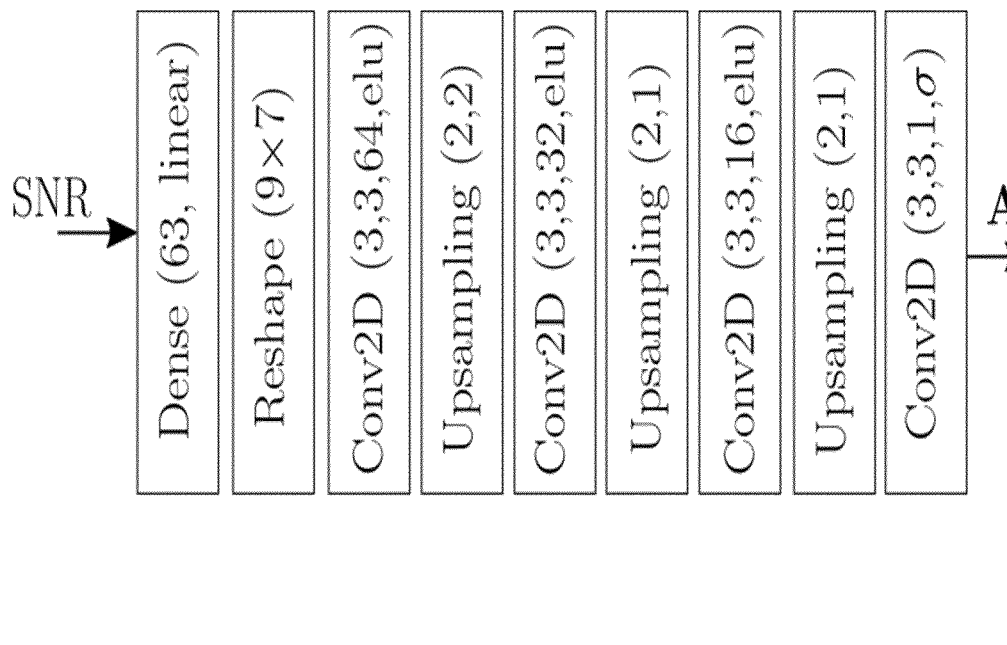
FIGS. 18 and 19 show neural network used in example embodiments.

Another approach is to generate the allocation matrix using an algorithm with trainable parameters (e.g., a neural network) from a given input. FIG. 18 shows a neural network, indicated generally by the reference numeral 180, used in some example embodiments.

In this neural network 180, the allocation matrix A is generated by a convolutional neural network from the SNR. In this particular example, the SNR is first fed to a dense layer which outputs a vector of size 63, reshaped to a matrix of size 9×7. This matrix is then fed to a succession of convolutional layers and up-sampling layers. The last convolution layer uses the sigmoid activation function to constrain the outputs to be in the range (0, 1). Using the neural network 180, the generated pilot allocation matrix has a shape of 73×14, which is compatible with the OFDM channel. In the neural network 180, the trainable parameters are the weights and biases of the dense and convolutional layers.

It is also possible to have the neural network 180 output directly the matrix of pilot symbols $X_P$. In this case, the transmit signal could be constructed as $X=X_P+X_D$ which is then normalized prior to transmission to ensure the power constraint. One could also have the neural network 180 computing a single scalar from the range (0, 1) used to perform uniform superimposed pilot allocation over the entire time-frequency grid.

It should be noted that the input of the neural network 180 is not restricted to the SNR. Other possible inputs include the coherence bandwidth, Doppler spread and angular spread.

Figure 19:

FIG. 19 shows a neural network, indicated generally by the reference numeral 190, used in some example embodiments. In the neural network 190, K is the number of bits per channel use. The trainable parameters are the weights and biases of the convolutional layers. Note that, with the architecture 190, no "explicit" channel estimation or equalization is performed. Since Y is complex-valued, one can feed its real and imaginary parts as different channels to the first convolutional layer.

It should be noted that the trainable receiver (e.g. the neural network 190) may be optimized jointly with the pilot allocation scheme.

Of course, many variants of the neural networks 180 and 190 are possible.

Figure 20:
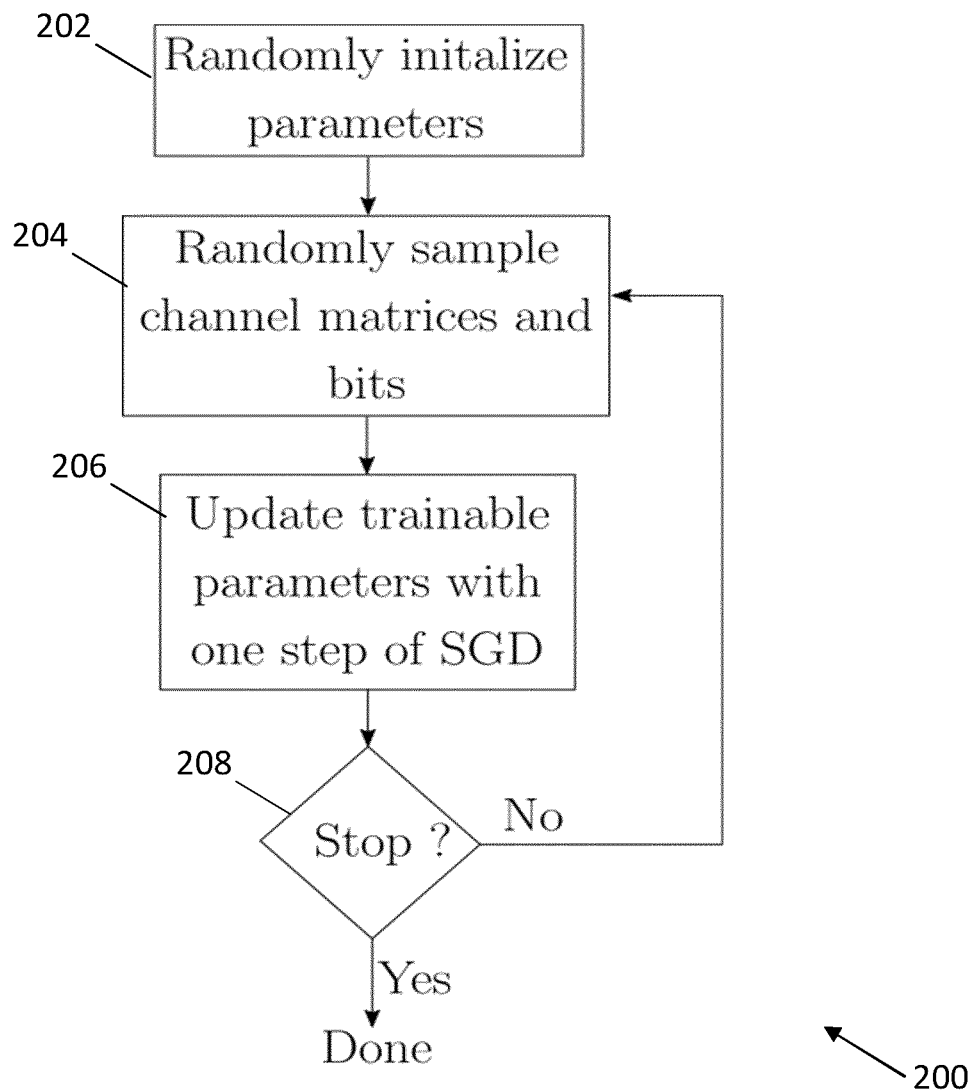
FIG. 20 is a flow chart showing an algorithm in accordance with an example embodiment.

Assuming a differentiable (and possibly trainable) receiver, the systems 130 or 150 may be optimized in an end-to-end manner. Training may use a dataset of channel matrices, which can be generated either by measurements or using a channel simulator. FIG. 20 is a flow chart showing an algorithm, indicated generally by the reference numeral 200, in accordance with an example embodiment. The algorithm 200 shows a possible training procedure.

The algorithm 200 starts at operation 202, where the trainable parameters of the superimposed pilot allocator are initialised. The parameters of the receiver (if trainable) may also be initialised. The initialisation in the operation 202 may be random, or pseudo-random, according to some distribution, e.g., Gaussian.

As described above, the pilot allocation may be used to allocates pilot symbols amongst a plurality of resource elements of an OFDM communication system. More specifically, the pilot allocation algorithm may sets a number of pilot signals and/or a distribution of pilot signals amongst the resource elements. Thus, both the quantity and the distribution of the pilot signals are potentially trainable.

At operation 204, B training examples are sampled (e.g. randomly or pseudo-randomly) from the dataset of channel matrices to (randomly) generate $BKN_TN_F$ modulated bits.

At operation 206, the trainable parameters are updated, for example by applying one step of stochastic gradient descent (SGD) on the loss $$L = -\frac{1}{B}\sum_{i=1}^{B}\sum_{j=1}^{N_FN_T}\sum_{k=1}^{K}\left(b_{j,k}^{(i)}\log(p_{j,k}^{(i)}) + (1-b_{j,k}^{(i)})\log(1-p_{j,k}^{(i)})\right)$$

where the superscript (i) is used to refer to the $i^{th}$ training example, $b_{j,k}$ is the $k^{th}$ bit mapped to the $j^{th}$ resource element, and $p_{j,k}$ is the probability that the eh bit mapped to the $j^{th}$ resource element is set to one. Note that the probability p of a bit to be set to one is obtain from the LLR computed by the receiver for this bit by p=σ(LLR).

The loss function L equals, up to a constant, the bit-metric decoding rate, which is the achievable information rate on bit-interleaved coded modulation systems widely used in practice. Therefore, by optimizing the system on L, one may optimize the ratio of power allocated to pilots in each resource element to achieve the highest possible information rate.

At operation 208, the algorithm 200 it is determined whether or not to stop the algorithm (according to some predefined condition, such as a stop criterion). Suitable stop criterions include stopping after a predefined number of iterations or when the loss function has not decreased for a predefined number of iterations. If the algorithm 200 is not to be stopped, the algorithm returns to the operation 204 described above.

A number of variants and extensions to the embodiments described above are possible. For example, one of more of:
  Joint optimization of the receiver with the pilot allocation scheme.
  Enforcing a sparsity constraint on A together with quantization of the values of A to either 0 or 1 to obtain orthogonal pilots. This would ensure backward compatibility with systems that do not allow for superimposed pilots. A sparsity constraint on A could be added to L together with quantization of the elements of A to either 0 or 1 to learn orthogonal pilot allocations. Sparsity could be achieved by adding a L1 norm penalty on A to the loss function. This would ensure backward compatibility with systems that do not allow for super-imposed pilots.
  The use of different loss functions, such as loss functions based on block error rate, bit error rate or categorical cross-entropy, for example if detection on symbols instead of bits is desired.
  Optimizing the modulation format used, e.g., geometric shaping, by making the mapping and modulation element 152 trainable.
  The learning rate, batch size, and possibly other parameters of the SGD variant (Adam, RMSProp . . . ) could be optimization hyperparameters.
  Other training methods could be used, such as evolutionary-based approaches, using the same loss function.

Many of the embodiments described above include features relating to handshaking and other protocol features. This is not essential to all embodiments. By way of example, some aspects of the invention are set out in the following numbered clauses.

Example 1. An apparatus comprising means for performing: initialising (e.g. random initialisation) parameters of pilot allocation algorithm, wherein the pilot allocation algorithm allocates pilot symbols amongst a plurality of resource elements of an OFDM communication system, wherein the OFDM communication system comprises a transmitter, a channel and a receiver; generating training data for transmission in accordance with the pilot allocation algorithm; updating trainable parameters (e.g. trainable weights of a neural network) of the pilot allocation algorithm based on a loss function, wherein the loss function is based on an information rate metric of the communication system; and repeating the generating and updating until a first condition is reached.

Example 2. The apparatus according to example 1, wherein the pilot allocation algorithm sets a number of pilot signals and/or a distribution of pilot signals amongst the resource elements. Thus, both the quantity and the distribution of pilot signals amongst resource elements are potentially trainable parameters.

Example 3. The apparatus according to example 1 or embodiment 2, wherein the transmitter is further configured to perform: modulating data bits to generate data symbols (the modulation itself may be trained (e.g. geometric shaping)—this may be an additional variable within the loss function); and superimpose the data symbols with pilot symbols in accordance with the pilot allocation algorithm (e.g. based on a pilot matrix generated by the pilot allocation algorithm).

Example 4. The apparatus according to any one of the preceding examples, wherein the pilot allocation algorithm comprises a neural network.

Example 5. The apparatus according to any one of the preceding examples wherein the pilot allocation comprises superimposed pilot signals or orthogonal pilot signals.

Example 6. The apparatus according to any one of the preceding examples, wherein the apparatus is further configured to perform: updating trainable parameters (e.g. trainable weights of a neural network) of a receiver algorithm based on said loss function.

Example 7. The apparatus according to any one of the preceding examples, wherein the loss function is related to one or more of block error rate, bit error rate and categorical cross-entropy.

Embodiment 8. The apparatus according to any one of the preceding examples, wherein at least some of the parameters of the pilot allocation algorithm (and, optionally, also the receiver algorithm) are trained using stochastic gradient descent.

Example 9. The apparatus according to any one of the preceding examples, wherein the first condition comprises a defined number of iterations and/or a predefined performance criterion according to said information rate metric.

Example 10. The apparatus according to any one of the preceding examples, further comprising means for performing: handshaking between the transmitter and the receiver of the communication system to initiate a training procedure, wherein said handshaking comprises a training setup request message (e.g. sent by the transmitter to the receiver or vice-versa) comprises parameters for the training procedure, wherein the transmitter comprises trainable parameters and/or the receiver comprises trainable parameters (for example, the transmitter and the receiver may be neural networks); sending identified training data from the transmitter to the receiver, wherein the training data comprises transmitter training data and/or receiver training data; sending training information from the receiver to the transmitter, wherein the training information comprises information for controlling training at the transmitter and/or the receiver; and terminating the training procedure. Termination could be by the transmitter or receiver. Termination could be by completion of by interruption.

Example 11. The apparatus according to any one of the preceding examples, wherein the means comprise: at least one processor; and at least one memory including computer program code, the at least one memory and the computer program configured, with the at least one processor, to cause the performance of the apparatus.

Example 12. A method comprising: initialising parameters of pilot allocation algorithm, wherein the pilot allocation algorithm allocates pilot symbols amongst a plurality of resource elements of an OFDM communication system, wherein the OFDM communication system comprises a transmitter, a channel and a receiver; generating training data for transmission in accordance with the pilot allocation algorithm; updating trainable parameters of the pilot allocation algorithm based on a loss function, wherein the loss function is based on an information rate metric of the communication system; and repeating the generating and updating until a first condition is reached.

Example 13. A transmitter of an OFDM communication system comprising the transmitter, a channel and a receiver, wherein the transmitter comprising a pilot allocation algorithm trained using the method of clause 12.

Example 14. The transmitter according to example 13, wherein the transmitter is further configured to perform: modulating data bits to generate data symbols; and superimposing the data symbols with pilot symbols using the pilot allocation matrix.

Example 15. A system comprising a transmitter according to example 13 or example 14 and further comprising a receiver of the OFDM system.

Example 16. A computer program comprising instructions for causing an apparatus to perform at least the following: initialising parameters of pilot allocation algorithm, wherein the pilot allocation algorithm allocates pilot symbols amongst a plurality of resource elements of an OFDM communication system, wherein the OFDM communication system comprises a transmitter, a channel and a receiver; generating training data for transmission in accordance with the pilot allocation algorithm; updating trainable parameters of the pilot allocation algorithm based on a loss function, wherein the loss function is based on an information rate metric of the communication system; and repeating the generating and updating until a first condition is reached.

Figure 21:
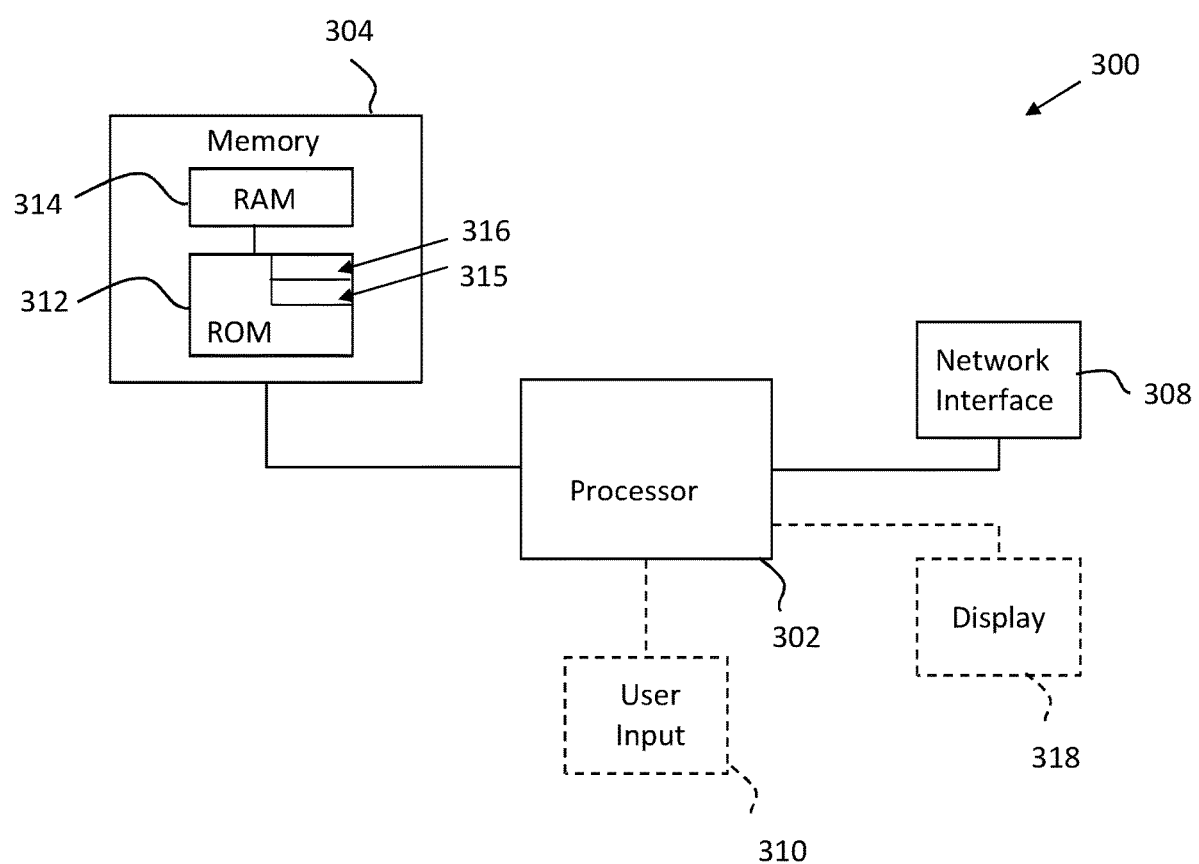
FIG. 21 is a block diagram of components of a system in accordance with an example embodiment.

For completeness, FIG. 21 is a schematic diagram of components of one or more of the example embodiments described previously, which hereafter are referred to generically as a processing system 300. The processing system 300 may, for example, be the apparatus referred to in the claims below.

The processing system 300 may have a processor 302, a memory 304 closely coupled to the processor and comprised of a RAM 314 and a ROM 312, and, optionally, a user input 310 and a display 318. The processing system 300 may comprise one or more network/apparatus interfaces 308 for connection to a network/apparatus, e.g. a modem which may be wired or wireless. The network/apparatus interface 308 may also operate as a connection to other apparatus such as device/apparatus which is not network side apparatus. Thus, direct connection between devices/apparatus without network participation is possible.

The processor 302 is connected to each of the other components in order to control operation thereof.

The memory 304 may comprise a non-volatile memory, such as a hard disk drive (HDD) or a solid state drive (SSD). The ROM 312 of the memory 304 stores, amongst other things, an operating system 315 and may store software applications 316. The RAM 314 of the memory 304 is used by the processor 302 for the temporary storage of data. The operating system 315 may contain code which, when executed by the processor implements aspects of the algorithms and message sequences 20, 30, 40, 50, 60, 70, 80, 90, 100, no, 160 and 200 described above. Note that in the case of small device/apparatus the memory can be most suitable for small size usage i.e. not always a hard disk drive (HDD) or a solid state drive (SSD) is used.

The processor 302 may take any suitable form. For instance, it may be a microcontroller, a plurality of microcontrollers, a processor, or a plurality of processors.

The processing system 300 may be a standalone computer, a server, a console, or a network thereof. The processing system 300 and needed structural parts may be all inside device/apparatus such as IoT device/apparatus i.e. embedded to very small size.

In some example embodiments, the processing system 300 may also be associated with external software applications. These may be applications stored on a remote server device/apparatus and may run partly or exclusively on the remote server device/apparatus. These applications may be termed cloud-hosted applications. The processing system 300 may be in communication with the remote server device/apparatus in order to utilize the software application stored there.

Figure 22A:
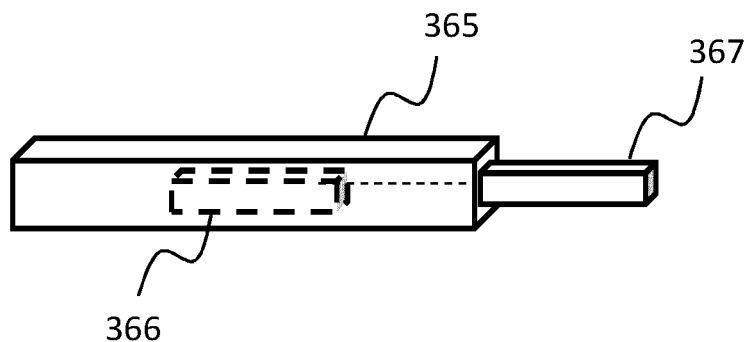
FIGS. 22A and 22B show tangible media, respectively a removable non-volatile memory unit and a Compact Disc (CD) storing computer-readable code which when run by a computer perform operations according to example embodiments.
Figure 22B:
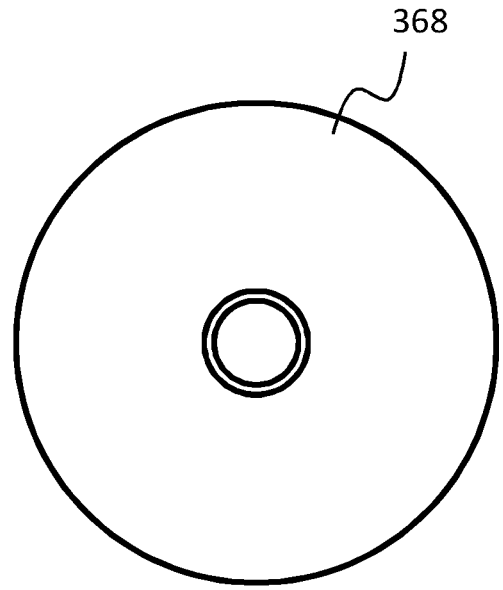

FIGS. 22A and 22B show tangible media, respectively a removable memory unit 365 and a compact disc (CD) 368, storing computer-readable code which when run by a computer may perform methods according to example embodiments described above. The removable memory unit 365 may be a memory stick, e.g. a USB memory stick, having internal memory 366 storing the computer-readable code. The internal memory 366 may be accessed by a computer system via a connector 367. The CD 368 may be a CD-ROM or a DVD or similar. Other forms of tangible storage media may be used. Tangible media can be any device/apparatus capable of storing data/information which data/information can be exchanged between devices/apparatus/network.

Embodiments of the present invention may be implemented in software, hardware, application logic or a combination of software, hardware and application logic. The software, application logic and/or hardware may reside on memory, or any computer media. In an example embodiment, the application logic, software or an instruction set is maintained on any one of various conventional computer-readable media. In the context of this document, a "memory" or "computer-readable medium" may be any non-transitory media or means that can contain, store, communicate, propagate or transport the instructions for use by or in connection with an instruction execution system, apparatus, or device, such as a computer.

Reference to, where relevant, "computer-readable medium", "computer program product", "tangibly embodied computer program" etc., or a "processor" or "processing circuitry" etc. should be understood to encompass not only computers having differing architectures such as single/multi-processor architectures and sequencers/parallel architectures, but also specialised circuits such as field programmable gate arrays FPGA, application specify circuits ASIC, signal processing devices/apparatus and other devices/apparatus. References to computer program, instructions, code etc. should be understood to express software for a programmable processor firmware such as the programmable content of a hardware device/apparatus as instructions for a processor or configured or configuration settings for a fixed function device/apparatus, gate array, programmable logic device/apparatus, etc.

If desired, the different functions discussed herein may be performed in a different order and/or concurrently with each other. Furthermore, if desired, one or more of the above-described functions may be optional or may be combined. Similarly, it will also be appreciated that the flow diagrams and message sequences of FIGS. 2 to 11, 16 and 20 are examples only and that various operations depicted therein may be omitted, reordered and/or combined.

It will be appreciated that the above described example embodiments are purely illustrative and are not limiting on the scope of the invention. Other variations and modifications will be apparent to persons skilled in the art upon reading the present specification.

Moreover, the disclosure of the present application should be understood to include any novel features or any novel combination of features either explicitly or implicitly disclosed herein or any generalization thereof and during the prosecution of the present application or of any application derived therefrom, new claims may be formulated to cover any such features and/or combination of such features.

Although various aspects of the invention are set out in the independent claims, other aspects of the invention comprise other combinations of features from the described example embodiments and/or the dependent claims with the features of the independent claims, and not solely the combinations explicitly set out in the claims.

It is also noted herein that while the above describes various examples, these descriptions should not be viewed in a limiting sense. Rather, there are several variations and modifications which may be made without departing from the scope of the present invention as defined in the appended claims.

The invention claimed is:

1. A receiver of a communication system, the receiver comprising:
   at least one processor; and
   at least one memory storing instructions that, when executed by the at least one processor, cause the receiver to:
      handshake with a transmitter of the communication system to initiate a training procedure, wherein said handshaking comprises a training setup request message comprising parameters for the training procedure, wherein the transmitter comprises trainable parameters or the receiver comprises trainable parameters;
      receive identified training data from the transmitter, wherein the training data comprises transmitter training data or receiver training data;
      send training information from the receiver to the transmitter, wherein the training information comprises information for controlling training at the transmitter or the receiver, and performance information that enables the trainable parameters of the transmitter to be trained;
      send a training interrupt message to the transmitter for indicating that training of the receiver or the transmitter is to be terminated;
      terminate the training procedure; and
      train, based on labelled training data, by updating the trainable parameters of the receiver, wherein the training data received from the transmitter comprises said receiver training data, wherein the communication system comprises an OFDM communication system having a pilot allocation that allocates pilot signals among resource elements of an OFDM transmission, wherein the pilot allocation includes determining a ratio of power to allocate to the pilot signals associated with each resource element, wherein the training comprises learning a mapping between received signals and log likelihood ratios (LLRs), given the pilot allocation, wherein an allocation matrix corresponding to the pilot allocation is trainable, wherein the pilot signals are superimposed with data symbols according to the allocation matrix, and wherein trainable parameters are updated and the ratio of power is optimized according to a loss function.

2. The receiver as claimed in claim 1, wherein the receiver training data comprises a sequence of known symbols sent by the transmitter to the receiver.

3. The receiver as claimed in claim 1, wherein the identified training data is identified by being provided in a dedicated training data channel.

4. The receiver as claimed in claim 1, wherein the training information comprises feedback data indicative of a readiness of the receiver to receive further receiver training data from the transmitter.

5. The receiver as claimed in claim 1, wherein the at least one memory and instructions further cause the receiver to perform sending a receiver initiated training setup request to the transmitter for initiating the handshaking.

6. The receiver as claimed in claim 1, wherein the at least one memory and instructions further cause the receiver to perform sending a receiver training complete message to the transmitter for indicating that training of the receiver is complete.

7. A transmitter of a communication system, the transmitter comprising:
   at least one processor; and
   at least one memory storing instructions that, when executed by the at least one processor, cause the transmitter to:
   handshake with a receiver of the communication system to initiate a training procedure, wherein said handshaking comprises a training setup request message comprises parameters for the training procedure, wherein the transmitter comprises trainable parameters or the receiver comprises trainable parameters;
   send identified training data to the receiver, wherein the training data comprises transmitter training data or receiver training data;
   receive training information from the receiver at the transmitter, wherein the training information comprises information for controlling training at the transmitter or the receiver, and performance information that enables the trainable parameters of the transmitter to be trained;
   send a training interrupt message to the receiver for indicating that training of the receiver or the transmitter is to be terminated;
   terminate the training procedure;
   train, based on the training data and the training information, by updating the trainable parameters of the transmitter, wherein the training data sent to the receiver comprises said transmitter training data, wherein the communication system comprises an OFDM system, wherein the transmitter generates a pilot allocation that allocates pilot signals among resource elements of the OFDM system, wherein the pilot allocation includes determining a ratio of power to allocate to the pilot signals associated with each resource element, and wherein the training comprises training an allocation matrix corresponding to the pilot allocation; and
   superimpose the pilot signals with data symbols by scaling the pilot signals and the data symbols according to the allocation matrix, wherein trainable parameters are updated and the ratio of power is optimized according to a loss function.

8. The transmitter as claimed in claim 7, wherein the receiver training data comprises a sequence of known symbols sent by the transmitter to the receiver.

9. The transmitter as claimed in claim 7, wherein the identified training data is identified by being provided in a dedicated training data channel.

10. The transmitter as claimed in claim 7, wherein the training information comprises feedback data indicative of a readiness of the receiver to receive further receiver training data from the transmitter.

11. The transmitter as claimed in claim 7, wherein the at least one memory and instructions further cause the transmitter to perform sending a transmitter-initiated training setup request for initiating the handshaking.

12. The transmitter as claimed in claim 7, wherein the at least one memory and instructions further cause the transmitter to perform sending a transmitter training complete message to the receiver for indicating that training of the transmitter is complete.

13. A method, comprising:
   handshaking between a transmitter and a receiver of a communication system to initiate a training procedure, wherein said handshaking comprises a training setup request message comprising parameters for the training procedure, wherein the transmitter comprises trainable parameters or the receiver comprises trainable parameters;
   receiving identified training data from the transmitter at the receiver, wherein the training data comprises transmitter training data or receiver training data;
   sending training information from the receiver to the transmitter, wherein the training information comprises information for controlling training at the transmitter or the receiver, and performance information that enables the trainable parameters of the transmitter to be trained;
   sending a training interrupt message to the transmitter for indicating that training of the receiver or the transmitter is to be terminated;
   terminating the training procedure; and
   training, based on labelled training data, by updating the trainable parameters of the receiver,
   wherein the training data received from the transmitter comprises said receiver training data,
   wherein the communication system comprises an OFDM communication system having a pilot allocation that allocates pilot signals among resource elements of an OFDM transmission,
   wherein the pilot allocation includes determining a ratio of power to allocate to the pilot signals associated with each resource element, wherein the training comprises learning a mapping between received signals and log likelihood ratios (LLRs), given the pilot allocation, wherein an allocation matrix corresponding to the pilot allocation is trainable, wherein the pilot signals are superimposed with data symbols according to the allocation matrix, and wherein trainable parameters are updated and the ratio of power is optimized according to a loss function.

14. A method, comprising:

handshaking between a transmitter and a receiver of a communication system to initiate a training procedure, wherein said handshaking comprises a training setup request message comprising parameters for the training procedure, wherein the transmitter comprises trainable parameters or the receiver comprises trainable parameters;

sending identified training data from the transmitter to the receiver, wherein the training data comprises transmitter training data or receiver training data;

receiving training information from the receiver at the transmitter, wherein the training information comprises information for controlling training at the transmitter or the receiver, and performance information that enables the trainable parameters of the transmitter to be trained;

sending a training interrupt message to the receiver for indicating that training of the receiver or the transmitter is to be terminated;

terminating the training procedure;

training, based on the training data and the training information, by updating the trainable parameters of the transmitter, wherein the training data sent to the receiver comprises said transmitter training data, wherein the communication system comprises an OFDM system, wherein the transmitter generates a pilot allocation that allocates pilot signals among resource elements of the OFDM system, wherein the pilot allocation includes determining a ratio of power to allocate to the pilot signals associated with each resource element, wherein the training comprises training an allocation matrix corresponding to the pilot allocation; and superimposing the pilot signals with data symbols by scaling the pilot signals and the data symbols according to the allocation matrix, wherein trainable parameters are updated and the ratio of power is optimized according to a loss function.

15. A non-transitory computer-readable medium comprising instructions encoded thereon which, when executed on an apparatus, cause the apparatus to perform at least:

handshaking between a transmitter and a receiver of a communication system to initiate a training procedure, wherein said handshaking comprises a training setup request message comprising parameters for the training procedure, wherein the transmitter comprises trainable parameters or the receiver comprises trainable parameters;

receiving identified training data from the transmitter at the receiver, wherein the training data comprises transmitter training data or receiver training data;

sending training information from the receiver to the transmitter, wherein the training information comprises information for controlling training at the transmitter or the receiver, and performance information that enables the trainable parameters of the transmitter to be trained;

sending a training interrupt message to the transmitter for indicating that training of the receiver or the transmitter is to be terminated, or sending a training interrupt message to the receiver for indicating that training of the receiver or the transmitter is to be terminated;

terminating the training procedure; and training, based on labelled training data, by updating the trainable parameters of the receiver, wherein the training data received from the transmitter comprises said receiver training data, wherein the communication system comprises an OFDM communication system having a pilot allocation that allocates pilot signals among resource elements of an OFDM transmission, wherein the pilot allocation includes determining a ratio of power to allocate to the pilot signals associated with each resource element, wherein the training comprises learning a mapping between received signals and log likelihood ratios (LLRs), given the pilot allocation, wherein an allocation matrix corresponding to the pilot allocation is trainable, wherein the pilot signals are superimposed with data symbols according to the allocation matrix, and wherein trainable parameters are updated and the ratio of power is optimized according to a loss function.

* * * * *